United States Patent
Yoon et al.

(10) Patent No.: US 12,470,236 B2
(45) Date of Patent: Nov. 11, 2025

(54) ANTENNA FILTER AND ELECTRONIC DEVICE COMPRISING SAME IN WIRELESS COMMUNICATION SYSTEM

(71) Applicant: SAMSUNG ELECTRONICS CO., LTD., Suwon-si (KR)

(72) Inventors: Seunghwan Yoon, Suwon-si (KR); Dongjoo Kim, Suwon-si (KR); Dongsik Shin, Suwon-si (KR); Jongwook Zeong, Suwon-si (KR); Danbi Jeon, Suwon-si (KR); Dabin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 17/981,848

(22) Filed: Nov. 7, 2022

(65) Prior Publication Data

US 2023/0062103 A1    Mar. 2, 2023

Related U.S. Application Data

(63) Continuation of application No. PCT/KR2021/005765, filed on May 7, 2021.

(Continued)

(51) Int. Cl.
*H04B 1/04* (2006.01)
*H01Q 5/335* (2015.01)

(52) U.S. Cl.
CPC ........... *H04B 1/0458* (2013.01); *H01Q 5/335* (2015.01); *H04B 2001/0408* (2013.01)

(58) Field of Classification Search
CPC ...... H04B 1/04; H04B 1/0458; H04B 1/0475; H04B 1/0483; H04B 2001/0408;

(Continued)

(56) References Cited

U.S. PATENT DOCUMENTS 6,961,368 B2 * 11/2005 Dent ..................... H04B 1/005
375/295
10,027,006 B2    7/2018 Cheng et al.
(Continued)

FOREIGN PATENT DOCUMENTS

CN    105914436    8/2016
JP    2004-200853    7/2004
(Continued)

OTHER PUBLICATIONS

Extended European Search Report dated Oct. 9, 2023 for EP Application No. 21799452.4.
(Continued)

*Primary Examiner* — Quochien B Vuong
(74) *Attorney, Agent, or Firm* — NIXON & VANDERHYE P.C.

(57) ABSTRACT

A $5^{th}$ generation (5G) or pre-5G communication system for supporting a higher data transfer rate than $4^{th}$ generation (4G) communication systems such as long term evolution (LTE). An apparatus for radiating a signal in a wireless communication system may include: a power amplifier; an antenna; and a combine filter unit configured to transfer an output signal of the power amplifier to the antenna. The combine filter unit may include: a first impedance matching circuit; a second impedance matching circuit; and a plurality of filters coupled in parallel between the first impedance matching circuit and the second impedance matching circuit. Allowable power of each of the plurality of filters may be lower than a maximum and/or predetermined power output of the power amplifier.

19 Claims, 17 Drawing Sheets

Related U.S. Application Data

(60) Provisional application No. 63/021,325, filed on May 7, 2020.

(58) Field of Classification Search
CPC ............ H01Q 5/00; H01Q 5/30; H01Q 5/321; H01Q 5/335
See application file for complete search history.

(56) References Cited

U.S. PATENT DOCUMENTS

| | | | |
|---|---|---|---|
| 10,418,951 B2* | 9/2019 | Poulin | H03F 3/24 |
| 10,498,298 B1* | 12/2019 | Wang | H03F 3/191 |
| 11,233,492 B2* | 1/2022 | Ashworth | H04B 1/0458 |
| 2006/0019611 A1 | 1/2006 | Mages | |
| 2010/0291888 A1 | 11/2010 | Hadjichristos et al. | |
| 2010/0291915 A1 | 11/2010 | Nast et al. | |
| 2013/0084915 A1 | 4/2013 | Asuri et al. | |
| 2013/0095895 A1 | 4/2013 | Asuri et al. | |
| 2014/0177493 A1 | 6/2014 | Kim et al. | |
| 2014/0327594 A1 | 11/2014 | Zhang et al. | |
| 2015/0280681 A1 | 10/2015 | Seo et al. | |
| 2016/0204493 A1 | 7/2016 | Park et al. | |
| 2017/0201302 A1 | 7/2017 | Kaneko et al. | |
| 2017/0302328 A1 | 10/2017 | Obiya et al. | |
| 2019/0181832 A1 | 6/2019 | Schmalzl et al. | |

FOREIGN PATENT DOCUMENTS

| | | |
|---|---|---|
| JP | 2004-235815 | 8/2004 |
| JP | 2006-340268 | 12/2006 |
| JP | 2014-39236 | 2/2014 |
| KR | 10-2012-0015455 | 2/2012 |
| KR | 10-2014-0072907 | 6/2014 |
| KR | 10-2014-0090205 | 7/2014 |
| KR | 10-2014-0090205 A | 7/2014 |
| KR | 10-1444551 | 9/2014 |
| KR | 10-2016-0002794 | 1/2016 |
| KR | 10-1588874 | 1/2016 |
| KR | 10-1595551 | 2/2016 |
| KR | 10-1693214 | 12/2016 |
| KR | 10-2017-0034408 | 3/2017 |
| KR | 10-2019-0067707 | 6/2019 |

OTHER PUBLICATIONS

European Office Action dated Mar. 27, 2025 for EP Application No. 21799452.4.

Korean Office Action dated Feb. 24, 2025 for KR Application No. 10-2022-7042359.

Notice of Patent Grant for KR Application No. 10-2022-7042359 issued Sep. 4, 2025 and English translation, 5 pages.

\* cited by examiner

ANTENNA FILTER AND ELECTRONIC DEVICE COMPRISING SAME IN WIRELESS COMMUNICATION SYSTEM

CROSS-REFERENCE TO RELATED APPLICATIONS

This application is a continuation of International Application No. PCT/KR2021/005765, filed on May 7, 2021, designating the United States, in the Korean Intellectual Property Receiving Office, and claiming priority to U.S. Application 63/021,325, filed on May 7, 2020, the disclosures of which are all hereby incorporated by reference herein in their entireties.

BACKGROUND

Field

Certain example embodiments relate to, in general, to a wireless communication system, and, for example, to an antenna filter in the wireless communication system, and/pr an electronic device including the antenna filter.

Description of Related Art

To meet a demand on wireless data traffic which has been in an increasing trend after a $4^{th}$ generation (4G) communication system was commercialized, there is an ongoing effort to develop an improved $5^{th}$ Generation (5G) communication system or a pre-5G communication system. For this reason, the 5G communication system or the pre-5G communication system is called a beyond 4G network communication system or a post long term evolution (LTE) system.

To achieve a high data transfer rate, the 5G communication system is considered to be implemented in an mmWave band (e.g., such as a 60 gigahertz (GHz) band). To reduce a propagation path loss at the mmWave band and to increase a propagation transmission distance, beamforming, massive multiple input multiple output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud radio access network (RAN), an ultra-dense network, device to device (D2D) communication, a wireless backhaul, a moving network, cooperative communication, coordinated multi-points (CoMP), and reception interference cancellation, or the like are being developed in the 5G communication system.

In addition thereto, hybrid frequency shift keying and quadrature amplitude modulation (FQAM) and sliding window superposition coding (SWSC) as an advanced coding modulation (ACM) technique and filter bank multi carrier (FBMC), non orthogonal multiple access (NOMA), and sparse code multiple access (SCMA), or the like as an advanced access technology are being developed in the 5G system.

Products equipped with multiple antennas are being developed to improve communication performance, and it is expected to use a device with a much greater number of antennas by utilizing a massive MIMO technology. With an increase in the number of antenna elements in a communication device, the number of radio frequency (RF) parts (e.g., a filter, etc.) inevitably increases.

SUMMARY

Based on the aforementioned discussion, certain example embodiments relate to an apparatus and/or method for miniaturizing or reducing a filter in a wireless communication system.

Certain example embodiments provide an apparatus and method for achieving the same performance as a high-power filter through a low-power filter in a wireless communication system.

Certain example embodiments provide an apparatus and method for replacing a metal cavity filter through a small-sized acoustic filter or ceramic filter.

Certain example embodiments provide a filter package or filter module in which a plurality of small filters are constructed through a plurality of splitters and a plurality of combiners in a wireless communication system.

Certain example embodiments provide a filter package or filter module in which an impedance matching circuit for a plurality of small filters is included in a wireless communication system.

Certain example embodiments provide a filter structure through splitters, combiners, and small filters which are modularized in a wireless communication system.

According to various example embodiments, an apparatus for radiating a signal in a wireless communication system may include: a power amplifier; an antenna; and a combine filter unit configured to transfer an output signal of the power amplifier to the antenna. The combine filter unit may include a first impedance matching circuit, a second impedance matching circuit, and a plurality of filters coupled in parallel between the first impedance matching circuit and the second impedance matching circuit. Allowable power of each of the plurality of filters may be lower than a maximum and/or predetermined power output of the power amplifier.

According to various embodiments, a massive multiple input multiple output (MIMO) unit (MMU) device may include: at least one processor; a plurality of power amplifiers; an antenna array including a plurality of sub-arrays; and a plurality of combine filter units. The plurality of combine filter units may be coupled to a corresponding power amplifier among the plurality of power amplifiers and a corresponding sub-array among the plurality of sub-arrays. A single combine filter unit among the plurality of combine filter units may include: a first impedance matching circuit; a second impedance matching circuit; and a plurality of filters coupled in parallel between the first impedance matching circuit and the second impedance matching circuit. Allowable power of each of the plurality of filters may be lower than a maximum power output of the power amplifier.

An apparatus and method according to various example embodiments may reduce a size and increase productivity while satisfying a rated capacity through a small-sized low-power filter structure for replacing a high-power filter, thereby effectively designing an antenna device including a plurality of radio frequency (RF) paths.

Advantages acquired in the disclosure are not limited to the aforementioned advantages, and other advantages not mentioned herein may be clearly understood by those skilled in the art to which the disclosure pertains from the following descriptions.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
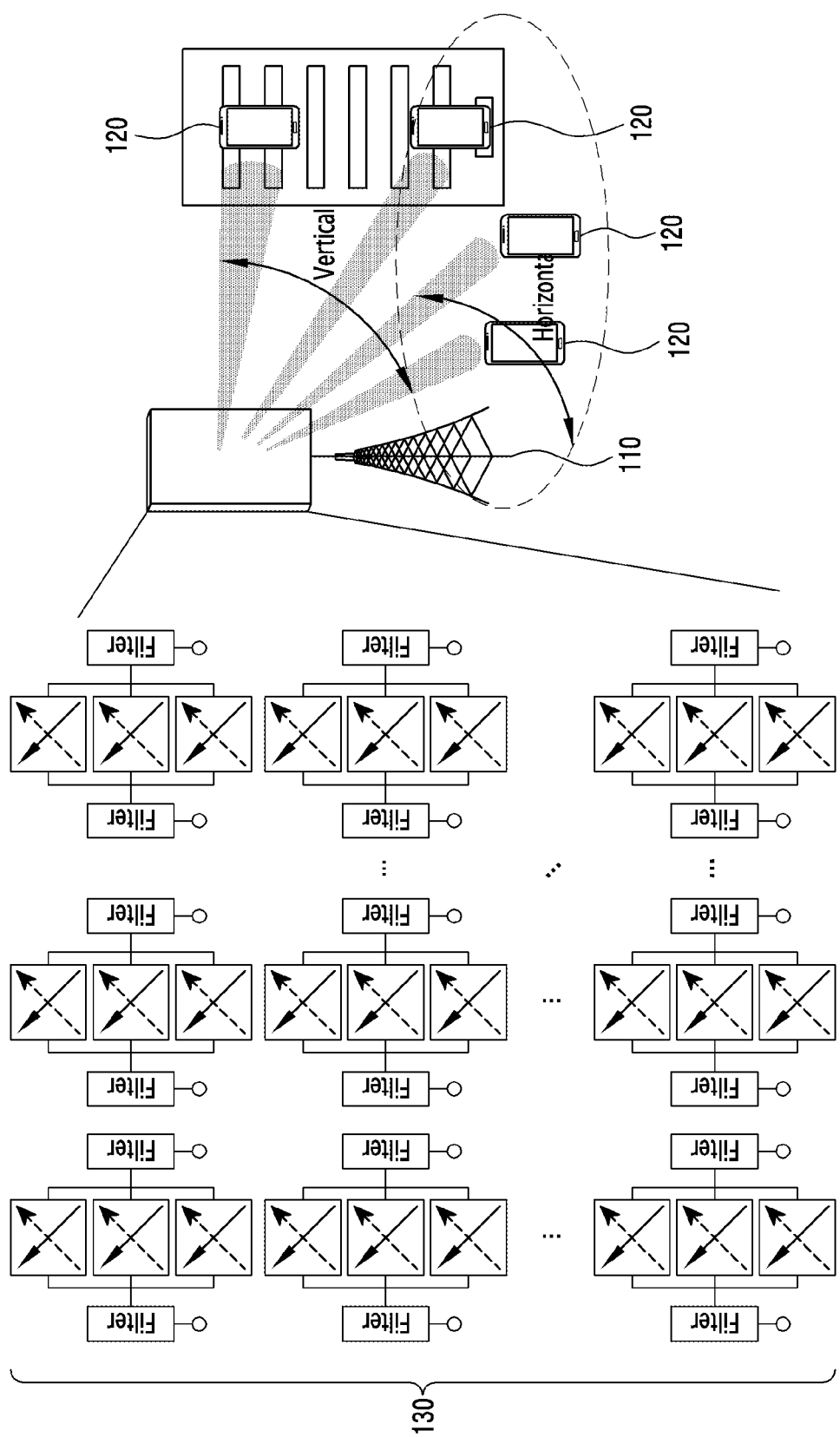
FIG. 1 illustrates a wireless communication system according to various example embodiments.

Terms used in the disclosure are for the purpose of describing particular example embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the example embodiments.

A hardware-based approach is described for example in the various example embodiments described hereinafter. However, since the various example embodiments include a technique in which hardware and software are both used, a software-based approach is not excluded in the example embodiments.

Hereinafter, terms used to refer to parts of an electronic device (e.g., a filter, an amplifier, a printed circuit board (PCB), a flexible PCB (FPCB), an antenna element, a compensation circuit, a processor, a chip, a component, and a device), terms used to refer to a shape of the parts (e.g., a construction, an opening, a connection portion, a contact portion, a guide portion, a protrusion portion, a fixed body, and an elastic body), terms used to refer to a circuitry (e.g., a splitter, a divider, a coupler, a combiner, a radio frequency (RF) path, a signal line, a data line, an RF signal line, an antenna line, an RF module, and an RF circuit), and the like are exemplified for convenience of explanation. Therefore, the disclosure is not limited to terms described below, and thus other terms having the same technical meaning may also be used. In addition, the term ' . . . unit', ' . . . device', ' . . . member', ' . . . body', or the like may imply at least one configuration or may imply a unit of processing a function.

In addition, although the disclosure describes various embodiments by using terms used in some communication standards (e.g., 3rd generation partnership project (3GPP), institute of electrical and electronics engineers, IEEE (IEEE)), this is for exemplary purposes only. Various example embodiments may be easily modified and applied to other communication systems.

Hereinafter, an example embodiment(s) relates to an antenna filter in a wireless communication system, and an electronic device including the antenna filter. Specifically, an example embodiment(s) describes a technique for achieving similar performance and miniaturizing a product by using a plurality of low-power filters (filters having a relatively low rated capacity) instead of the existing high-power filter (a filter having a relatively high rated capacity) in the wireless communication system.

The high-power filter and low-power filter mentioned in an example embodiment(s) may be determined according to whether a medium is used inside a resonator. In the high-power filter, the filter may operate only when intensity of a field per unit volume is not concentrated. When the medium is used inside the resonator, a size of the resonator is decreased, and the intensity for the field per unit volume is increased due to a dielectric, which is not suitable for the high-power filter. A resonator constructed of only air without using a medium is larger in size than a resonator filled with the medium. In addition, such a resonator has small intensity of a field per unit volume since there is no medium, which is suitable for the high-power filter. Therefore, the high-power filter and the low-power filter may be identified depending on whether the medium is used inside the resonator. According to an embodiment, the low-power filter may include an acoustic filter or a ceramic filter. For example, the acoustic filter may include a surface acoustic wave (SAW) filter. In addition, for example, the acoustic filter may include a bulk acoustic wave (BAW) filter. Hereinafter, although the BAW filter is exemplified in an example embodiment(s) as an example of the low-power filter, example embodiments are not limited thereto. In each embodiment, other small-sized filters corresponding to the aforementioned criterion may be used in addition to the BAW filter.

FIG. 1 illustrates a wireless communication system according to various example embodiments. As part of nodes which use a radio channel, a base station 110 and a terminal 120 are exemplified in a wireless communication environment 100 of FIG. 1.

The base station 110 is a network infrastructure which provides a radio access to the terminal 120. The base station 110 has a coverage defined as a specific geographic region, based on a distance capable of transmitting a signal. In addition to the term 'base station', the base station 110 may be referred to as an 'access point (AP)', an 'eNodeB (eNB)', a '5th generation (5G) node', a '5G NodeB (NB)', a 'wireless point', a 'transmission/reception point (TRP)', an 'access unit', a distributed unit (DU)', a 'radio unit (RU)', a 'remote radio head (RRH)', or other terms having equivalent technical meanings. The base station 110 may transmit a downlink signal or receive an uplink signal.

As a device used by a user, the terminal 120 communicates with the base station 110 through the radio channel.

Optionally, the terminal 120 may be operated without user involvement. That is, as a device for performing machine type communication (MTC), the terminal 120 may not be carried by the user. In addition to the term 'terminal', each of the terminal 120 may be referred to as a 'user equipment (UE)', a 'mobile station', a 'subscriber station', a 'customer premises equipment (CPE)', a 'remote terminal', a 'wireless terminal', an 'electronic device', a 'vehicular terminal', a 'user device', or other terms having equivalent technical meanings.

A beamforming technology is used as one of technologies for reducing a propagation path loss and increasing a propagation transmission distance. In general, the beamforming uses a plurality of antennas to concentrate a propagation arrival region or increase directivity of reception intensity. Therefore, instead of using a single antenna to produce a signal in an isotropic pattern, a communication device may be equipped with a plurality of antennas to form beamforming coverage. According to an embodiment, the base station 110 may include a massive MIMO unit (MMU). An antenna array has a form in which a plurality of antennas are aggregated. Each antenna included in the antenna array may be referred to as an array element or an antenna element. The antenna array may be configured in various shapes such as a linear array, a planar array, or the like. The antenna array may be referred to as a massive antenna array.

A primary technology for improving data capacity of 5G communication is a beamforming technology using an antenna array coupled to a plurality of RF paths. For higher data capacity, the number of RF paths shall be increased or power for each RF path shall be increased. The increasing of the RF path results in a larger size of products and is no longer possible at present due to a spatial constraint in the installing of a base station in practice. In order to increase an antenna gain through a high power output without having to increase the number of RF paths, a plurality of antenna elements may be coupled by using a splitter (or divider), thereby increasing the antenna gain. Herein, the antenna elements corresponding to the RF path may be referred to as a sub-array. According to an embodiment, an antenna array 130 may include a plurality of sub-arrays. For example, the antenna array 130 of FIG. 1 may include sub-arrays, each of which is constructed of three antenna elements. In addition, each of the sub-arrays of the antenna array 130 may include at least one filter.

Although the base station 110 of FIG. 1 is described for example to explain an antenna filter of an example embodiment(s) and an electronic device including the antenna filter, various example embodiments are not limited thereto. As the antenna filter according to various example embodiments and the electronic device including the antenna filter, not only the base station 110 but also a wireless device which performs a function equivalent to the base station, a wireless device (e.g., TRP) coupled to the base station, the terminal 120 of FIG. 1, or other communication devices used for 5G communication are possible. Hereinafter, although an antenna array constructed of sub-arrays is described for example as a structure of a plurality of antennas for communication in a multiple input multiple output (MIMO) environment, an easy modification for beamforming is possible in some embodiments.

To increase communication performance, there is an increase in the number of antennas (or antenna elements) of a device (e.g., the base station 110) performing wireless communication. In particular, there is also an increase in the number of antennas, RF parts (e.g., an amplifier, a filter) and components for processing an RF signal received or transmitted through the antenna. Therefore, a spatial gain and cost efficiency are necessarily required while satisfying communication performance when a communication device is configured.

As described above, with an increase in the number of paths, the number of filters for processing a signal in each antenna element is also increased. The filter indicates a circuit which performs filtering to transfer a signal of a desired frequency by forming a resonance. That is, the filter may perform a function for selectively identifying a frequency. Meanwhile, in order to dispose a plurality of filters in a limited space, it is required to make the filter small in size and light in weight. Hereinafter, a method for implementing this using a low-power filter according to various example embodiments will be described with reference to FIG. 2A, FIG. 2B, and FIG. 2C.

Figure 2A:
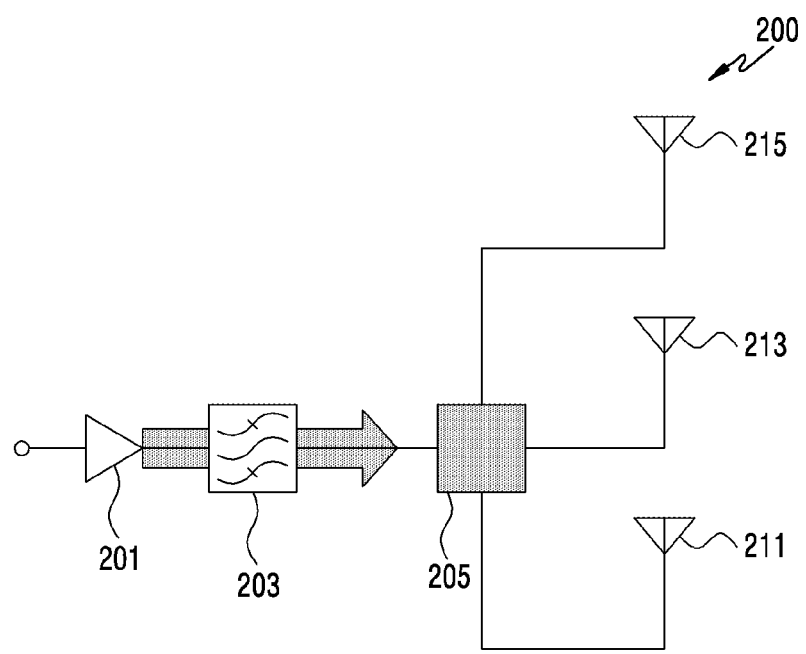
FIG. 2A, 2B and FIG. 2C illustrate features of a combine filter according to example embodiments.
Figure 2B:
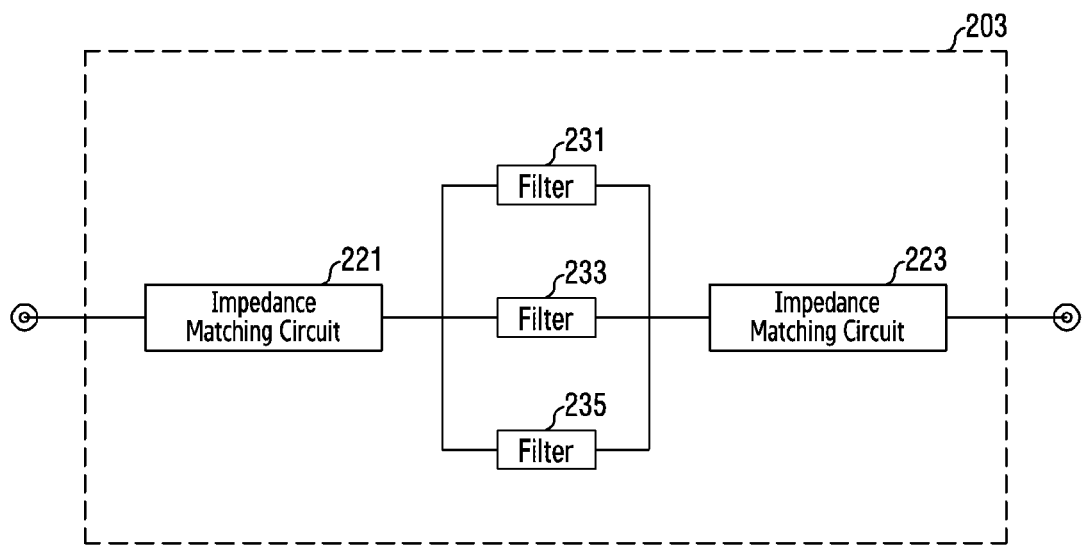
Figure 2C:
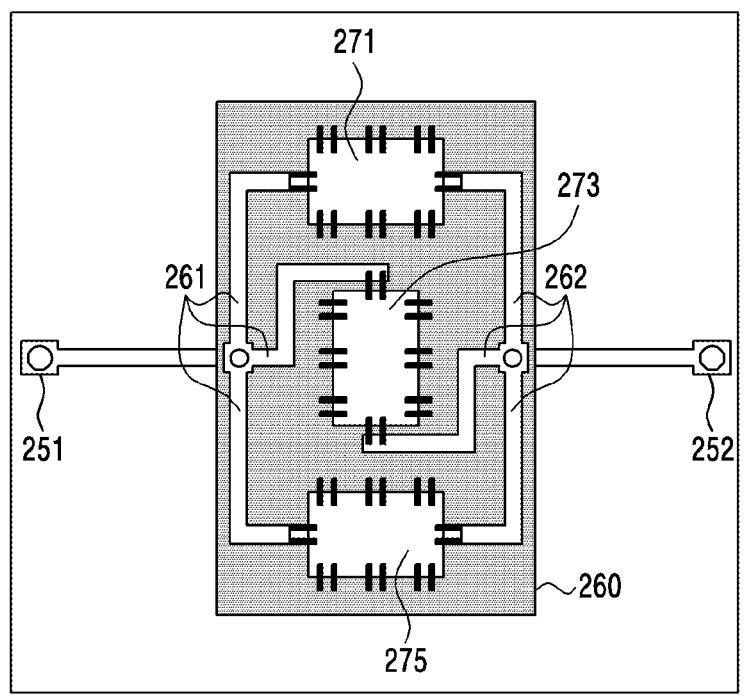

FIG. 2A, FIG. 2B, and FIG. 2C illustrate a principle of designing a combine filter according to example embodiments. Hereinafter, although an example in which a sub-array of an array antenna includes three antenna elements is described in FIG. 2A, FIG. 2B, and FIG. 2C, this is only an example for explaining example embodiments, and is not construed as limiting the scope of the disclosure.

Referring to FIG. 2A, an electronic device 200 may include a power amplifier 201, a filter 203, a splitter 205 (or a divider), a first antenna element 211, a second antenna element 213, and a third antenna element 215.

The power amplifier 201 may amplify power of an input signal to provide a high power output. For example, the power amplifier 201 may provide an output signal of up to M Watt. In this case, the filter 203 shall be able to control power of M Watt. In other words, the filter 203 may have an allowable rated capacity of M Watt. A signal which has passed through the power amplifier 201 and the filter 203 may be transferred to each antenna element through the splitter 205. The first antenna element 211, the second antenna element 213, and the third antenna element 215 may be coupled to one RF path through the splitter 205. The first antenna element 211, the second antenna element 213, and the third antenna element 215 may be coupled to the filter 203 through the RF path.

In order to increase the total data capacity without having to increase the number of RF paths, an antenna gain of a sub-array may be increased through the high power output. When there is an increase in power for each RF path, a rated capacity of an amplifier and filter which are main elements of the RF path shall also be increased. Recently, power higher than 3 watt (W) is required. To this end, a large and heavy metal resonator filter has conventionally been used. The metal resonator filter is constructed of metal, and includes several resonators. The metal resonator filter requires a separate material (e.g., metal) for fixing, and each resonator is very sensitive and thus disadvantageously has to be individually tuned manually through a screw. The tuning deteriorates mass productivity, causes a high defect rate, and raises a filter price. Therefore, although the high-power filter is reliable in terms of performance, it is not suitable for mass production due to an increase in the number of antenna elements and RF paths.

In order to replace the aforementioned high-power filter, there is research on a method for utilizing a low-power filter (e.g., a surface acoustic wave (SAW) filter, a bulk acoustic wave (BAW) filter) which is relatively small in size and light in weight. However, when the high-power filter is simply replaced with the low-power filter, power to be supplied exceeds allowable power of the low-power filter, which may cause a problem. Therefore, various example embodiments propose a combine filter including a plurality of low-power filters, as the filter 203. The combine filter may be configured to supply relatively low power to each low-power tiler, by distributing high power. A principle of configuring the combine filter is described with reference to FIG. 2B.

A functional configuration of the combine filter for replacing a high-power filter with a plurality of low-power filters through power distribution is exemplified in FIG. 2B. The filter 203 may include a structure in which a plurality of filters 231, 233, and 235 are combined. The filter 203 may include the plurality of filters 231, 233, and 235, a first impedance matching circuit 221, and a second impedance matching circuit 223. Each of the plurality of filters 231, 233, and 235 may be a low-power filter. For power distribution, the filter 203 may include paths in which a signal path is branched according to the number of filters. The filter 203 may include transmission lines for branching each path. According to an embodiment, the path branch may consist of or include a transmission line. According to another embodiment, additional elements may be added to the transmission line. When the plurality of filters 231, 233, and 235 which are disposed in parallel are directly coupled to an input stage and an output stage, an impedance mismatch may occur. Since the impedance mismatch between the input stage and the output stage causes inefficiency in power transmission, a circuit for resolving this problem is required.

The filter 203 according to various embodiments may include an impedance matching circuit at each of the input stage and the output stage. The filter 203 may include the first impedance matching circuit 221 and the second impedance matching circuit 223. The first impedance matching circuit 221 may be configured such that a load impedance and an input impedance at the input stage of the filter 203 are matched. The load impedance may indicates an impedance sum of the plurality of filters 231, 233, and 235 and the first impedance matching circuit 221. The second impedance matching circuit 223 may be configured such that a load impedance and an impedance viewed at the output stage of the filter 203 are matched. The load impedance may indicates an impedance sum of the plurality of filters 231, 233, and 235 and the second impedance matching circuit 223.

An example of a filter structure of a combine filter for replacing a high-power filter with a plurality of low-power filters through power distribution is shown in FIG. 2C. The deployment and structure of each component shown in FIG. 2C are only an example for describing the power distribution principle, and are not construed as limiting another embodiment of the disclosure using the same principle.

Referring to FIG. 2C, the filter 203 may include an input unit 251 and an output unit 252. The input unit 251 may include a transmission line for an impedance matching circuit between the input stage and a filter unit 260. The transmission line may include a λ/4 impedance transformer to be described later. Meanwhile, unlike in FIG. 2C, as the impedance matching circuit, lumped elements may be used instead of the impedance transformer.

A signal which has passed through the power amplifier 201 of FIG. 2 may be applied to the input stage. Thereafter, an RF signal applied to the input stage may be transferred to the filter unit 260 via the input unit 251. Thereafter, the RF signal which has passed through the filter unit 260 may be transferred to a sub-array via the output unit 252. The filter unit 260 may include a splitter 261, a combiner 262, a first low-power filter 271, a second low-power filter 273, and a third low-power filter 275. An output of a power amplifier may be transferred to the filter unit 260 via the output unit 252. Herein, it is assumed that the power amplifier is able to provide an output signal of up to M Watt. In this case, the filter unit 260 shall be able to control power of M Watt.

The splitter 261 and the combiner 262 may be constructed to distribute high power of a high-power filter so that each filter of the filter unit 260 withstands relatively low power. The splitter 261 may provide each low-power filter with a signal transferred from the input unit 251. The combiner 262 may combine a signal which has passed through each low-power filter, and may provide the combined signal to the output unit 252. Herein, the splitter 261 may indicates a deployment of transmission paths for branching. For example, the splitter 261 may include one transmission line corresponding to the input stage and three transmission lines for path branching. Likewise, the combiner 262 may indicates a deployment of transmission lines for combining. For example, the combiner 262 may include three transmission lines according to path branching and one transmission line corresponding to the output stage. According to an embodiment, each of the splitter 261 and the combiner 262 may be constructed of only transmission lines. According to another embodiment, each of the splitter 261 and the combiner 262 may further include an element (e.g., a resistor) for increasing an isolation characteristic of each path. Although a configuration for distributing and combining an RF signal has been described by referring to the splitter and the combiner, the splitter and the combiner may perform other functions according to a signal flow as a passive element for combining signals. A circuit for performing power distribution/synthesis in a combine filter according to various embodiments may be referred to as a coupler, a divider, a splitter, a brancher, a multiplexer, or the like. That is, when designing a combine filter for a plurality of low-power filters, although a splitter/combiner is described for convenience of description, this description merely indicates that each designed circuit performs a function of the splitter/combiner, and does not exclude a role as another function (e.g., combiner/splitter) of the passive element.

The first low-power filter 271 may be disposed between the splitter 261 and the combiner 262. The second low-power filter 273 may be disposed between the splitter 261 and the combiner 262. The third low-power filter 275 may be disposed between the splitter 261 and the combiner 262. To process power of M Watt, each filter may be required to process power of M/N Watt. Herein, N may denote the number of filters coupled to the splitter (or the number of antenna elements coupled to the splitter, the number of antenna elements of the sub-array). In the example of FIG. 2C, each of the first low-power filter 271, second low-power filter 273, and third low-power filter 275 may have a rated capacity so as to withstand power of M/3 Watt. As such, in order to withstand a high power output of the power amplifier by using a filter having a low rated capacity, a configuration according to various example embodiments may include a plurality of low-power filters constructed together with the splitter 261 and the combiner 262.

The plurality of low-power filters may be disposed to at least one substrate layer. According to an embodiment, the plurality of low-power filters may be constructed as a package. For example, as shown in FIG. 2B, the combine filter may include low-power filters disposed as a 3-in-1 type package. As another example, the combine filter may include low-power filters disposed as a 2-in-1 type package (i.e., two low-power filters/dies and one package) or a 4-in-1 type package (i.e., four low-power filters/dies and one package). Such a package bundle of low-power filters may be referred to as a combine package filter (or a combine filter package). The package may include a die for the filter. For example, the package may include a die for each filter. In addition, as another example, the package may include one large die for all of the low-power filters. Meanwhile, the die is only a component for implementing the filter in the package, and a corresponding term and a structure based thereon are not construed as limiting an embodiment.

The combine package filter may be disposed on an RF path in various manners. In some embodiments, the combine package filter may be disposed on the RF path, as a package itself. A combine filter packaged into a plurality of low-power filters may be mounted on a board. According to an embodiment, the board may be a board (e.g., an antenna feeder unit (AFU)) attached to antenna elements. The combine filter may be disposed before branching a sub-array including antenna elements. For example, the combine filter may be disposed on a side face different from a side on which an antenna is mounted. According to another embodiment, the board may be mounted on a board on which a plurality of RF elements are combined. For example, the combine filter may be disposed to one face on which other RF elements of the board are disposed. In some other embodiments, the combine package filter may be modularized. The combine package filter may include a module substrate for the combine package filter. In other words, the combine package filter may be disposed to one face of a printed circuit board (PCB) constructed of one or more layers. The PCB may also be referred to as a module PCB, a small PCB, or a mini PCB so as to be distinguished from a board for other RF elements. For example, as shown in FIG. 2C, the module PCB may include transmission lines corresponding to the input unit 251 and the output unit 252, in addition to the filter 260. Through modularization, each filter module may be relatively easily attached and detached.

As described above, example embodiments may include a structure in which a filter is attached to each branch of a splitter, instead of using one filter on one RF path. According to an embodiment, power branched to each path may be identical. In association with the number N of paths branched by the splitter, the power transferred to each filter may be reduced by 1/N. According to another embodiment, the power branched through the splitter may not be identical. The power transferred to each filter may be reduced by a per-path power distribution ratio. As such, since each filter is disposed to the path branched by the splitter, power transferred through each path branched by the splitter is reduced. The use of such a characteristic makes it possible to satisfy a high rated capacity by attaching N filters having a capacity lower than a rated capacity respectively to N paths after being branched by the splitter, instead of using a filter with a high rated capacity on an RF path.

Various methods may be used to check whether to implement the combine filter of an example embodiment(s). According to an embodiment, whether to implement the combine filter based on example embodiments may be checked through a structure of being branched inside a filter unit and a low-power filter disposed to each branch. In addition, according to an embodiment, when a rated capacity of each of the plurality of filters of the filter unit is lower than a power output from the power amplifier or a rated capacity of the filter unit itself, whether to implement a deployment structure of the low-power filter located at a rear end of the splitter may be checked.

In some embodiments, to make mass production easy, filters included in respective filter units may be the same type of low-power filters. In addition, all of the plurality of filter units for the antenna array may also include the same type of low-power filters. Due to the mass production of the same type of filters, it is possible to be connected to each sub-array with a small error. The small error may lead to a minimum cumulative loss of the entire antenna array, thereby providing an advantage of performance improvement. In other words, the structure of deploying the same type of low-power filters may not only replace a high-power filter but also provide an additional advantage of improving total transmission performance by being disposed to each of a plurality of sub-arrays. In some other embodiments, the low-power filter with a low rated capacity may be constructed in various types in an example embodiment(s). The filters included in respective filter units may be constructed in different types, or filters for respective sub-arrays may be constructed in different types.

Since the filter is disposed to each of the plurality of paths branched through the splitter/combiner, it is possible to implement a 5G device through relatively small-sized low-power filters, without a high-power filter requiring tuning. A basic function of the filter is to filter out a required frequency band by using a piezoelectric material which resonates at a specific frequency. According to an embodiment, the low-power filter may be a BAW filter. Since a SAW filter has electrodes on a surface of the piezoelectric material, there is a limitation in miniaturization. In addition, performance thereof is limited at a high frequency above 2 GHz. On the other hand, the BAW filter has electrodes on top and bottom portions of the piezoelectric material, and performs filtering on a signal vertically. Therefore, the BAW filter shows excellent performance in miniaturization, high frequency response, or the like. According to an embodiment, the BAW filter may be implemented using a micro electro mechanical systems (MEMS) element.

The BAW filter advantageously has a possibility of miniaturization and integration. In a wireless mobile communication system, since it is required to support a high frequency due to a trend of miniaturization and multi-functionality of a base station, a terminal, or the like, there is a growing need thereof. Although the BAW filter has a disadvantage in that an allowed power output is low, a power output required in the BAW filter may be decreased through the deployment structure of an example embodiment(s) (by being deployed on a path branched through the splitter). Therefore, through the structure of being branched through the splitter/combiner, the antenna array device may be implemented to include the BAW filter. By using the BAW filter, the antenna array device may be implemented effectively in terms of miniaturization and cost. In addition, performance of the antenna array may be maximized by minimizing or reducing a defect rate/error between parts through mass production.

According to another embodiment, the low-power filter may be the SAW filter. In a specific frequency band (e.g., 1.9 GHz), the SAW filter may be used as a low-power filter disposed after the splitter. In this case, not only that the SAW filter is used in a specific sub-array and the BAW filter is used in another specific sub-array but also that the SAW filter is used as the low-power filter in all arrays may be understood as an embodiment.

Figure 3:
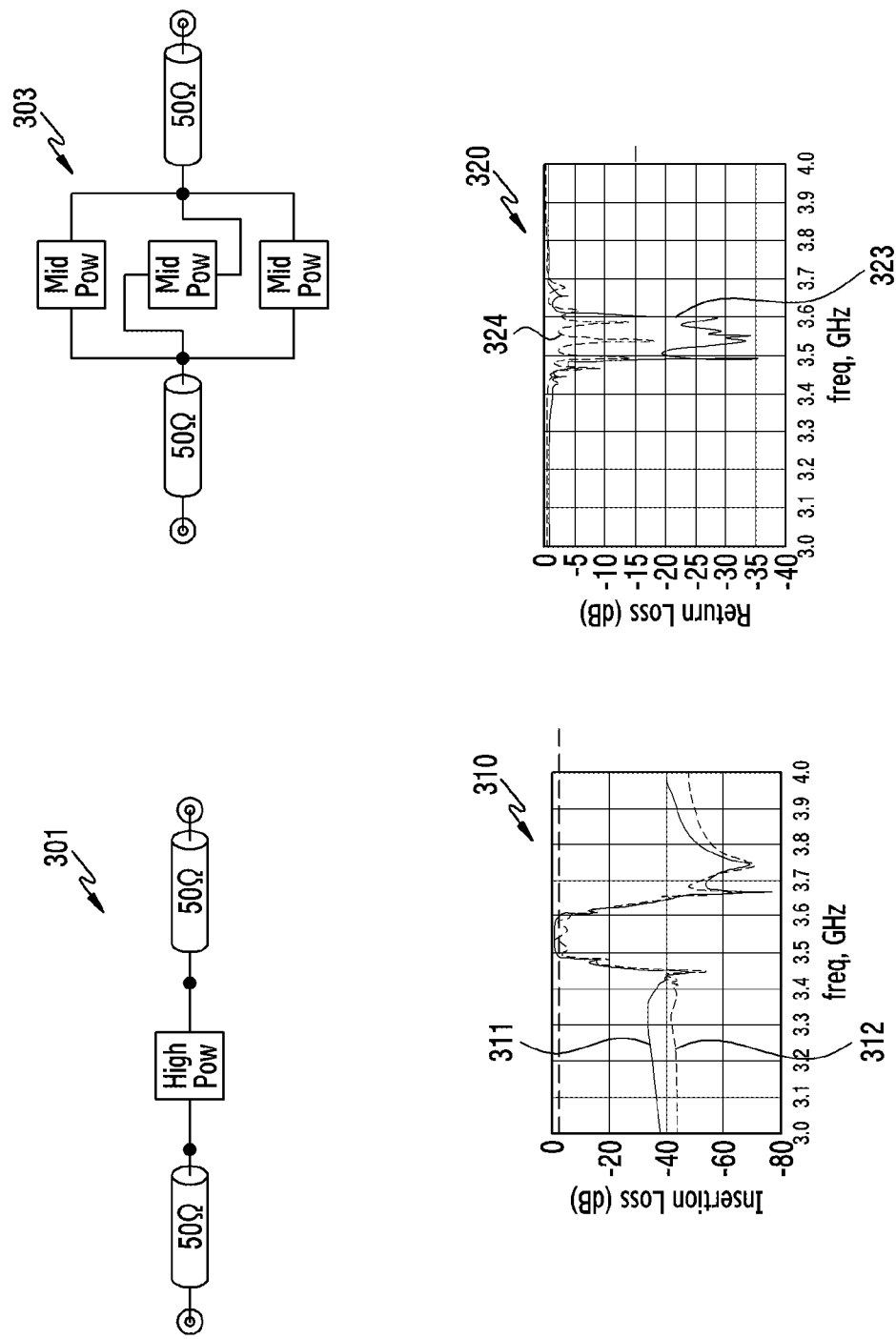
FIG. 3 illustrates examples of a performance graph through a combine filter according to example embodiments.

FIG. 3 illustrates examples of a performance graph through a combine filter according to example embodiments. A BAW filter is exemplified as a filter included in the combine filter. Performance is expressed in terms of an insertion loss and a return loss. The insertion loss indicates a loss which occurs when passing through a corresponding element, and the return loss indicates a loss which occurs when an input signal of the element is reflected and returned.

Referring to FIG. 3, a circuit of a single filter 301 using one BAW filter and a combine filter 303 including three BAW filters is illustrated. When implemented with the single filter 301, the BAW filter is required to be designed with a high power output to satisfy a rated capacity. However, this deployment is not suitable for mass production since it is difficult to make a product small in size and light in weight. Meanwhile, if a low-power filter is combined similarly to the combine filter 303, an impedance mismatch may occur.

A first graph 310 shows a relationship between a frequency and an insertion loss. A horizontal axis represents the frequency (unit: GHz). A vertical axis represents the insertion loss (unit: decibel (dB)). A first line 311 represents insertion loss performance of the single filter 301. A second line 312 represents insertion loss performance of the combine filter 303. In the combine filter 303, a ripple occurs at a pass band due to the impedance mismatch. That is, the combine filter 303 without an impedance matching circuit is unstable at the pass band since a required performance 315 is repeatedly satisfied and unsatisfied.

A second graph 320 shows a relationship between a frequency and a return loss. A horizontal axis represents the frequency (unit: GHz). A vertical axis represents the return loss (unit: dB). A third line 323 represents return loss performance of the single filter 301. A fourth line 324 represents return loss performance of the combine filter 303. The combine filter 303 causes a high return loss in the pass band due to the impedance mismatch, similarly to the insertion loss. The combine filter 303 without an impedance matching circuit is unstable at the pass band since it is difficult to satisfy a required performance 325.

The combine filter may include a plurality of (e.g., 3) branched paths to distribute a high power output of a power amplifier. An impedance mismatch may occur due to the plurality of branched paths. For example, when a transmission line has an impedance of 50 ohms, the impedance mismatch occurs since the impedance of the combine filter has an impedance of 50/3 ohms. There is a problem in that a signal of an input stage is not sufficiently transferred to an output stage due to the impedance mismatch, which causes performance degradation of the insertion loss and the return loss. Therefore, it is required to design an impedance matching circuit for the combine filter according to example embodiments. An example of performance comparison based on the design is described with reference to FIG. 4.

Figure 4:
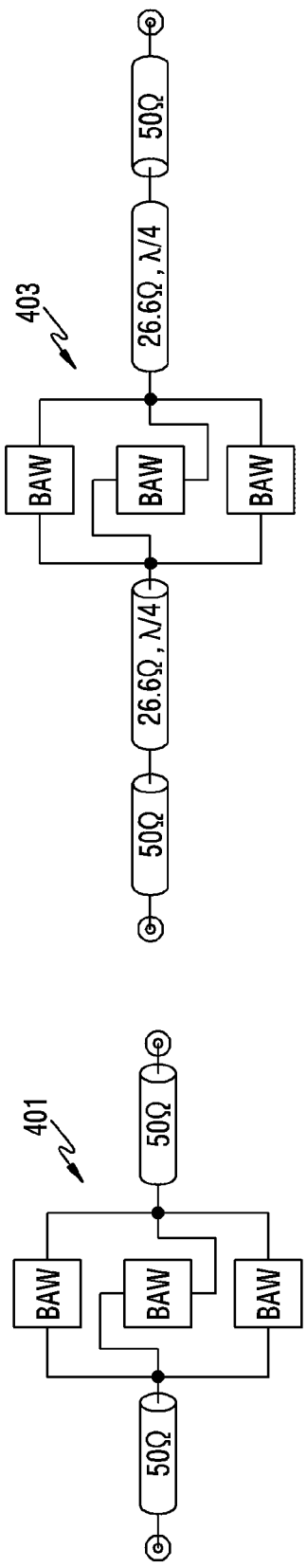
FIG. 4 illustrates examples of performance graphs depending on the presence or absence of a matching circuit according to example embodiments.
Figure 4:
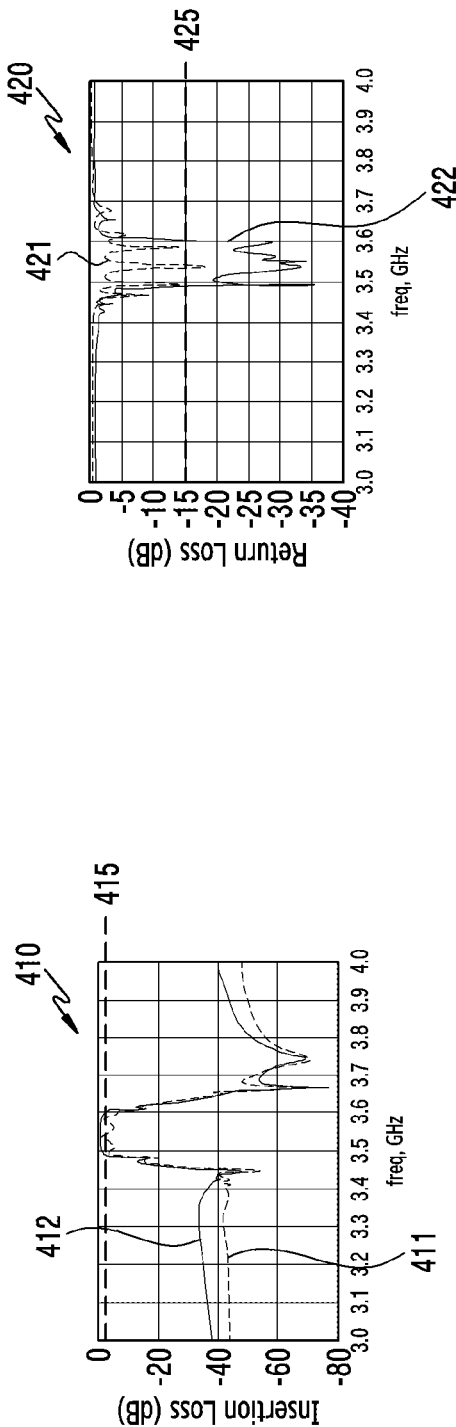

FIG. 4 illustrates examples of performance graphs depending on the presence or absence of a matching circuit according to example embodiments. Performance is expressed as an insertion loss and a return loss.

Referring to FIG. 4, although both filter circuits to be compared include a combine filter including three BAW filters, a first combine filter 401 may not include a matching circuit, and a second combine filter 403 may include the matching circuit. A method of using a transmission line of λ/4 (λ denotes a wavelength) has been illustrated as an example of an impedance matching circuit. However, a method of designing another impedance matching circuit (e.g., designing a series/parallel stub or L-C circuit) may be used individually or together, in addition to the method of using the transmission line of λ/4.

A first graph 410 shows a relationship between a frequency and an insertion loss. A horizontal axis represents the frequency (unit: GHz). A vertical axis represents the insertion loss (unit: dB). A first line 411 represents insertion loss performance of the first combine filter 401. A second line 412 represents insertion loss performance of the second combine filter 403. In the first combine filter 401, a ripple occurs at a pass band due to the impedance mismatch. However, the second combine filter 403 may provide stable performance satisfying a performance 415 at the pass band, through the impedance matching circuit.

A second graph 420 shows a relationship between a frequency and a return loss. A horizontal axis represents the frequency (unit: GHz). A vertical axis represents the return loss (unit: dB). A third line 421 represents return loss performance of the first combine filter 401. A fourth line 424 represents return loss performance of the second combine filter 403. The first combine filter 401 causes a high return loss in the pass band due to the impedance mismatch, similarly to the insertion loss. The second combine filter 403 may provide a low return loss while satisfying a required performance 425, through the impedance matching circuit.

As described with reference to FIG. 4, it is required to design an impedance matching circuit for a combine filter according to example embodiments. The impedance matching circuit may be defined in various manners. Hereinafter, specific examples of designing an impedance matching circuit for a combine filter are described with reference to FIG. 5 to FIG. 7B.

Figure 5:
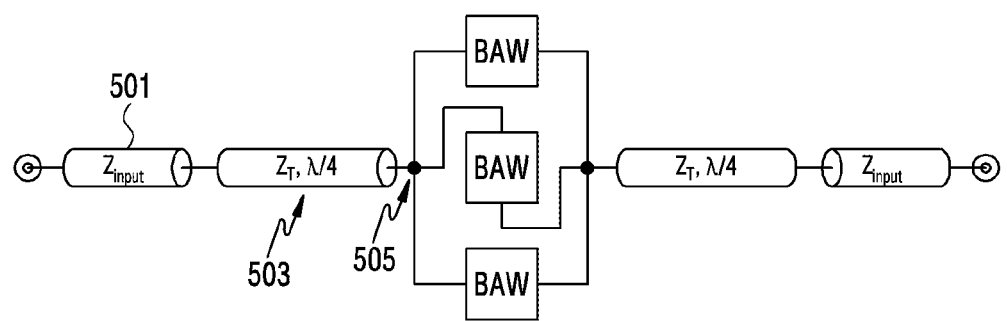
FIG. 5 illustrates an example of designing an impedance matching circuit according to example embodiments.

FIG. 5 illustrates an example of designing an impedance matching circuit according to example embodiments. In FIG. 5, an impedance transformer is exemplified as the impedance matching circuit.

Referring to FIG. 5, an input impedance 501 may be $Z_{input}$. An impedance transformer 503 may have an impedance of $Z_T$, as an impedance transformer using a λ/4 transmission line. Assuming that a load impedance 505 is $Z_{total}$, the input impedance $Z_{input}$ may be expressed by the following equation.

$$Z_{input} = Z_T \frac{Z_{total} + jZ_T \tan\beta l}{Z_T + jZ_{total} \tan\beta l} \quad \text{[Equation 1]}$$

Herein, l is a line length, and β is $2\eta/\lambda$. Since l=λ/4, Equation 1 may be approximated by the following equation.

$$Z_{input} = \frac{Z_T^2}{Z_{total}} \quad \text{[Equation 2]}$$

When the combine filter consists of or includes N low-power filters (e.g., BAW filters), the combine filter may include N branches, i.e., N RF paths. An input impedance of the low-power filters serves as the load impedance 505. Since impedances of respective branches are coupled in parallel, the load impedance 505 may be expressed by Equation 3 below.

$$Z_{total} = \frac{1}{\sum_{i=1}^{N} \frac{1}{Z_i}} \quad \text{[Equation 3]}$$

Herein, $Z_i$ denotes an impedance of an i-th branch.

Through Equation 1 to Equation 3, $Z_T$ required when designing the impedance transformer 503 may be derived as shown in Equation 4 below.

$$Z_T = \sqrt{\frac{Z_{input}}{\sum_{i=1}^{N} \frac{1}{Z_i}}} \quad \text{[Equation 4]}$$

Since the λ/4 impedance transformer is used in the transmission line, a mismatch caused by a resistance component of the impedance may be resolved relatively easily.

Figure 6:
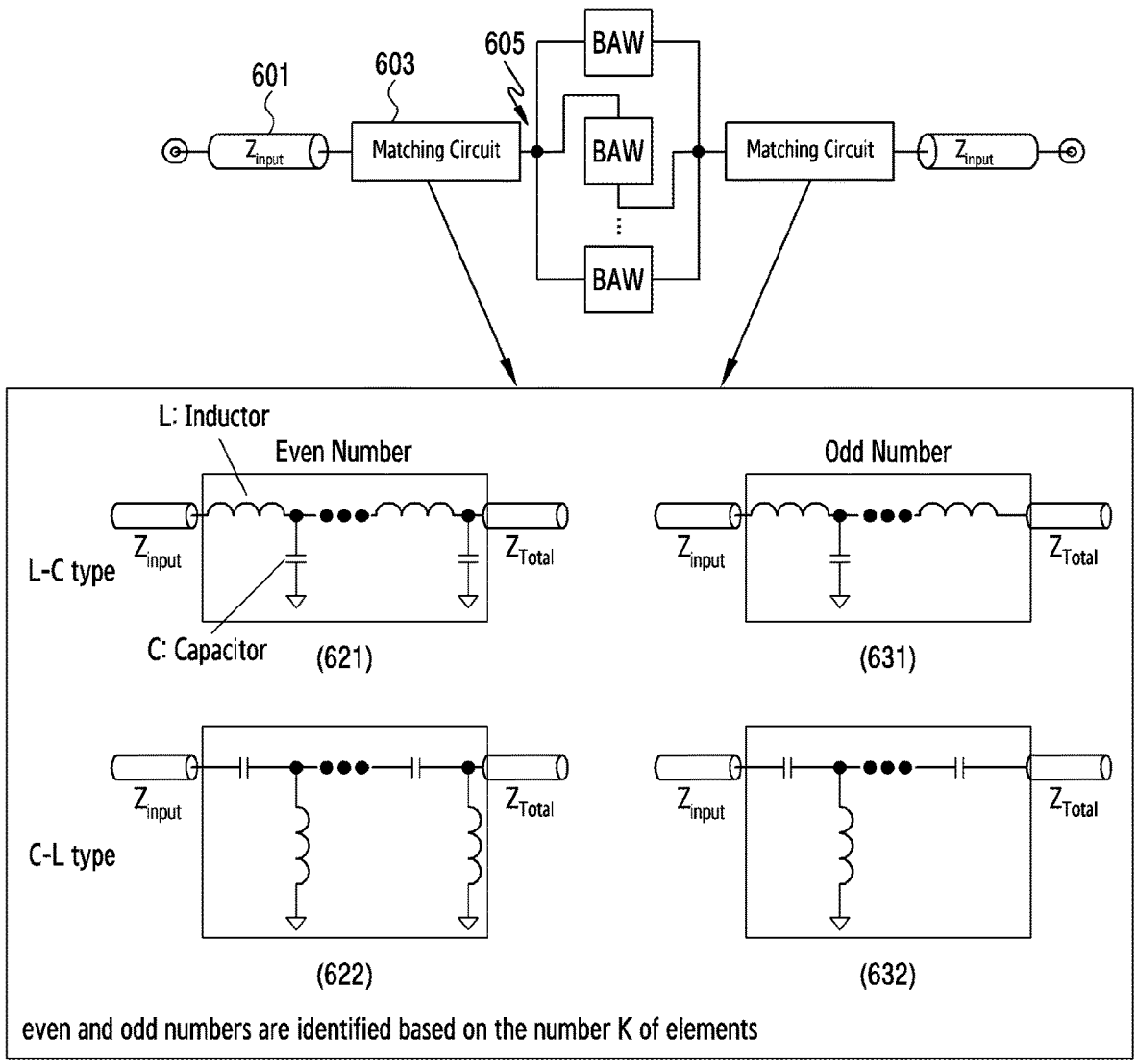
FIG. 6 illustrates another example of a design of an impedance matching circuit according to example embodiments.

FIG. 6 illustrates another example of a design of an impedance matching circuit according to example embodiments. Lumped elements are used as the impedance matching circuit. An inductor (hereinafter, L) and a Capacitor (hereinafter, C) may be used as the lumped element. The lumped element may be used for a wider bandwidth smaller than a distributed element.

Referring to FIG. 6, an input impedance 601 may be $Z_{input}$. A sum of the input impedances for low-power filters may be $Z_{total}$. For example, a load impedance 605 may be expressed by the Equation 3 above. In order to match the load impedance to the input impedance, various LC combination circuits may be used. When a reactance is added in series to the load, it moves along an impedance circle in an impedance Smith chart. In this case, when an inductive reactance is added to the load, it moves clockwise along the impedance circle of the Smith chart. When a capacitive reactance is added to the load, it moves counterclockwise along the impedance circle of the Smith chart. The LC combination circuit may be constructed such that a total resistance caused by the load impedance 605 and an impedance matching circuit 603 is equal to the input impedance 601.

According to an embodiment, the impedance matching circuit 603 may include a first circuit 621 of an L-C type consisting of or including an even number of LC elements. The L-C type indicates a type in which an inductor (L) is constructed in series and a capacitor (C) is constructed in parallel (shunt). According to another embodiment, the impedance matching circuit 603 may include a second circuit 622 of a C-L type consisting of or including an even number of LC elements. The C-L type indicates a type in which a capacitor (C) is constructed in series and an inductor (L) is constructed in parallel (shunt). According to another embodiment, the impedance matching circuit 603 may include a third circuit 631 of an L-C type consisting of or including an odd number of LC elements. According to another embodiment, the impedance matching circuit 603 may include a fourth circuit 632 of an L-C or C-L type consisting of or including an odd number of LC elements. A specific impedance matching method for each type is described in detail with reference to FIG. 7A and FIG. 7B.

Although 4 types of LC circuits are exemplified in FIG. 6, LC circuits of other configurations are not excluded. Constructing of the LC circuit in which an impedance combined with a total impedance of low-power filters matches an input impedance differently from the 4-types of circuits is also understood as an embodiment.

Figure 7A:
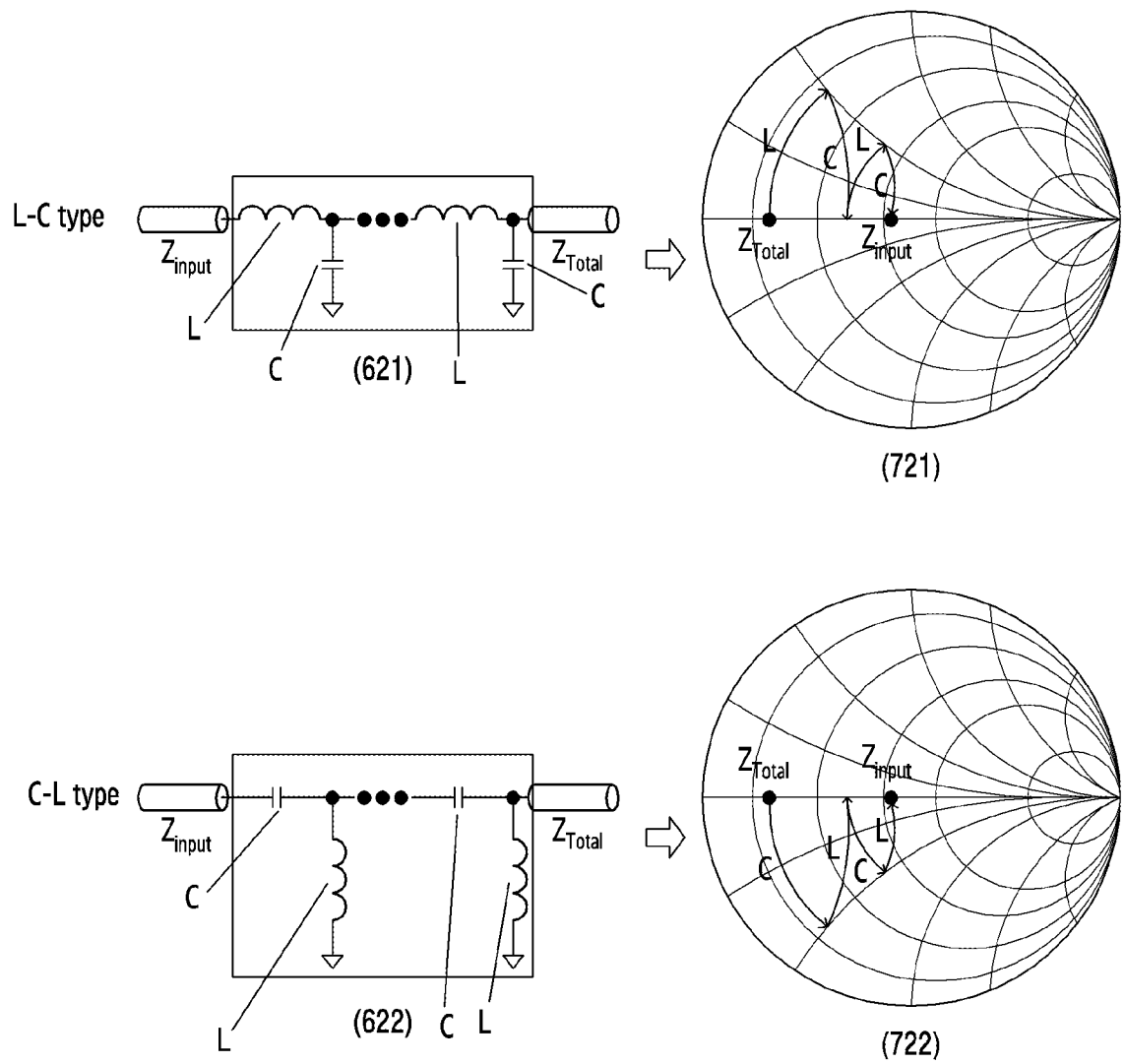
FIG. 7A and FIG. 7B illustrate examples of a Smith chart depending on an impedance matching circuit according to example embodiments.
Figure 7B:
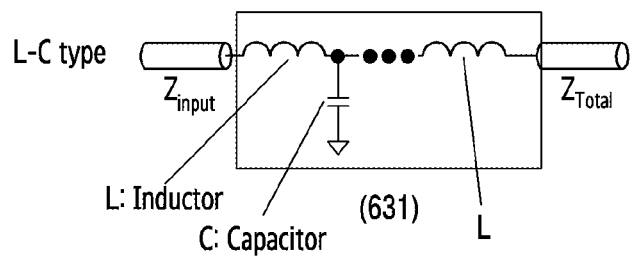
Figure 7B:
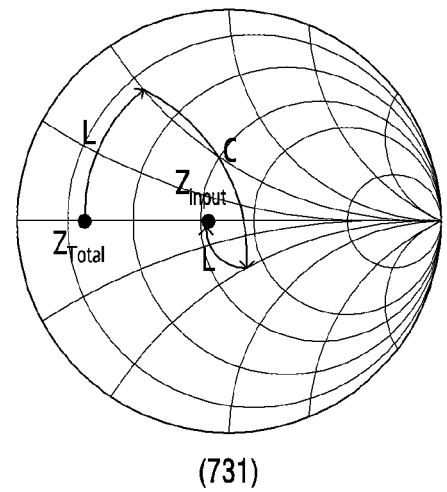
Figure 7B:
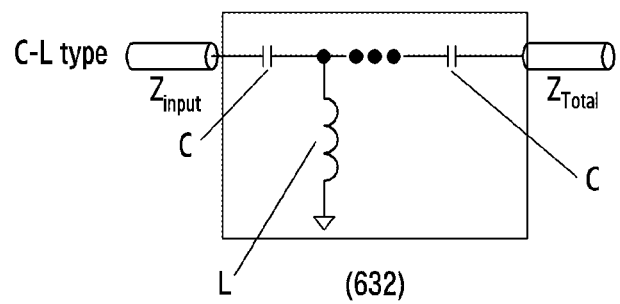
Figure 7B:
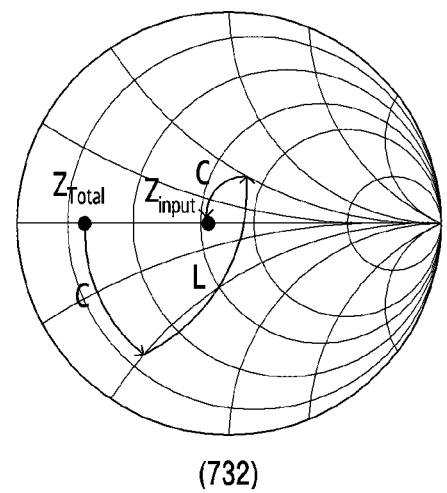

FIG. 7A and FIG. 7B illustrate examples of a Smith chart depending on an impedance matching circuit according to example embodiments. When a reactance is added in series to a load, it may move along an impedance circle in an impedance Smith chart. In this case, when an inductive reactance is added in series to the load, it moves clockwise along the impedance circle of the Smith chart. When a capacitive reactance is added in series to the load, it moves counterclockwise along the impedance circle of the Smith chart. When a reactance is added in parallel to the load, it moves along an admittance circle in the impedance Smith chart. In this case, when an inductive reactance is added in parallel to the load, it moves counterclockwise along the admittance circle of the Smith chart. When a capacitive reactance is added in parallel to the load, it moves clockwise along the admittance circle in the Smith chart.

FIG. 7A illustrates Smith charts, when the number of LC elements is an even number. A center of the Smith chart is related to impedance matching. A first Smith chart 721 represents an impedance circle of the first circuit 621 of FIG. 6. Since L is coupled in series and C is coupled in parallel, an impedance rotates clockwise on the impedance circle and clockwise on an admittance circle. In this manner, an L-C structure of an impedance matching circuit may be repeated such that a total impedance is an input impedance. The total impedance is modified from an inductive load to a resistive load of the input impedance. A third Smith chart 722 represents an impedance circle of the third circuit 623 of FIG. 6. Since C is coupled in series and L is coupled in parallel, an impedance rotates counterclockwise on an impedance circle and counterclockwise on an admittance circle. In this manner, a C-L structure of an impedance matching circuit may be repeated such that a total impedance is an input impedance. The total impedance is modified from a capacitive load to a resistive load of the input impedance.

FIG. 7B illustrates Smith charts, when the number of LC elements is an odd number. A center of the Smith chart is related to impedance matching. A second Smith chart 731 represents an impedance circle of the second circuit 631 of FIG. 6. Since L is coupled in series and C is coupled in parallel, an impedance rotates clockwise on the impedance circle and clockwise on an admittance circle. In this manner, an L-C structure of an impedance matching circuit may be repeated such that a total impedance is an input impedance. After the inductive load and the capacitive load are repeated, the total impedance is modified to a resistive load of the input impedance. A fourth Smith chart 732 represents an impedance circle of the fourth circuit 632 of FIG. 6. Since C is coupled in series and L is coupled in parallel, an impedance rotates counterclockwise on an impedance circle and counterclockwise on an admittance circle. In this manner, a C-L structure of an impedance matching circuit may be repeated such that a total impedance is an input impedance. After the capacitive load and the inductive load are repeated, the total impedance is modified to a resistive load of the input impedance.

An impedance matching method using an impedance transformer is descried in FIG. 5, and a method of implementing a matching circuit by using a lumped element such as an inductor or a capacitor is described in FIG. 6A to FIG. 7C. However, this is only an example of an impedance matching method for a combine filter including low-power filters, and does not limit example embodiments. According to another embodiment, stub matching may be used for the combine filter. A stub indicates an open or shorted transmission line, and may be added in series or parallel to a load. There is an advantage in that the impedance matching circuit may be implemented with a low loss at a high frequency through the stub. In addition, according to another embodiment, the impedance matching circuit for the combine filter may be implemented by combining the aforementioned methods.

According to an embodiment, the aforementioned combine filter may be constructed as one package or one module. In this case, several dies may be located in one package. Since the plurality of dies are disposed on one substrate, phase management is relatively less required, and package/module cost may be reduced. In particular, since a filter may be disposed anywhere on a transmitting/receiving board or an antenna board, the filter constructed as the package or the module has an advantage in that an RF board is easily constructed. In addition, since the number of dies depends on the number of distribution paths, the plurality of dies disposed to one package make it possible to implement low-power filters in each die.

Figure 8A:
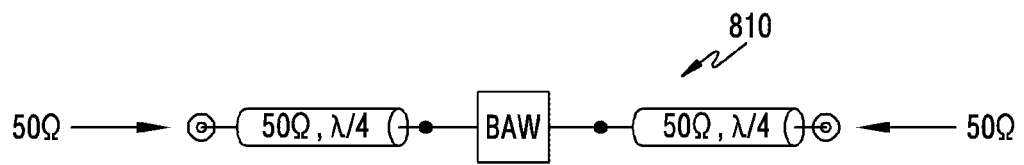
FIGS. 8A, 8B and 8C illustrate examples of a package including a combine filter and an impedance matching circuit according to example embodiments.
Figure 8A:
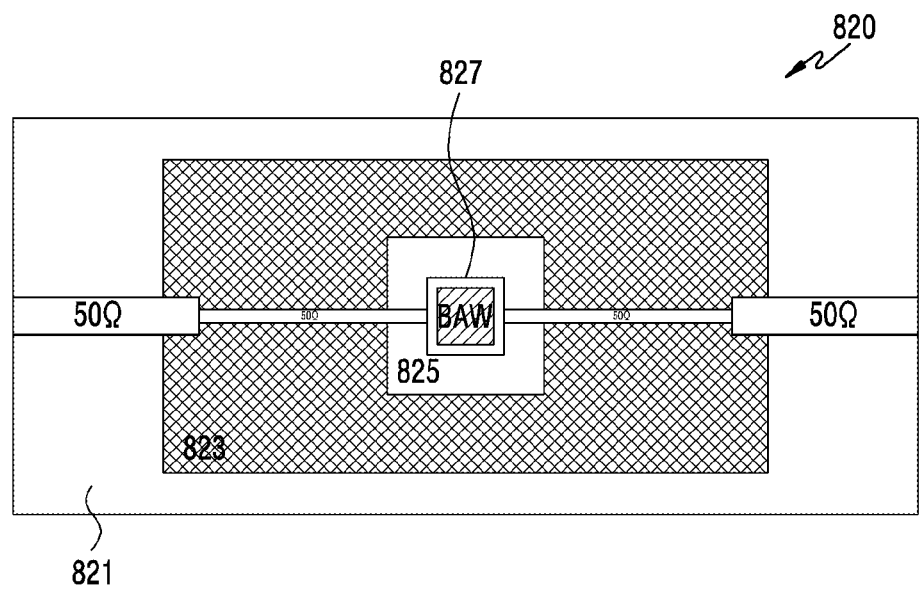
Figure 8A:
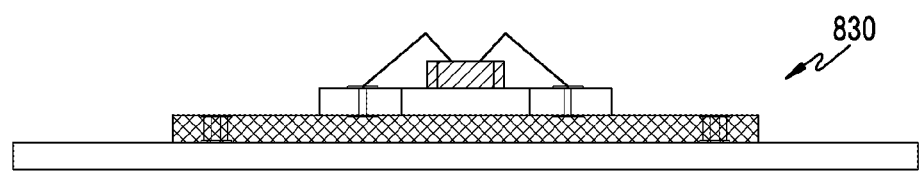
Figure 8B:
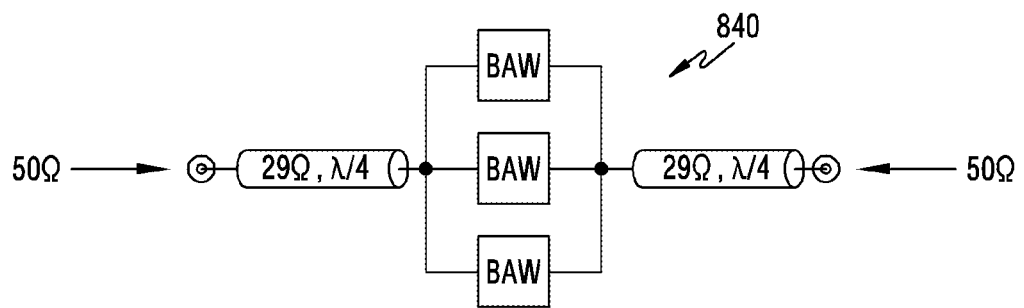
Figure 8B:
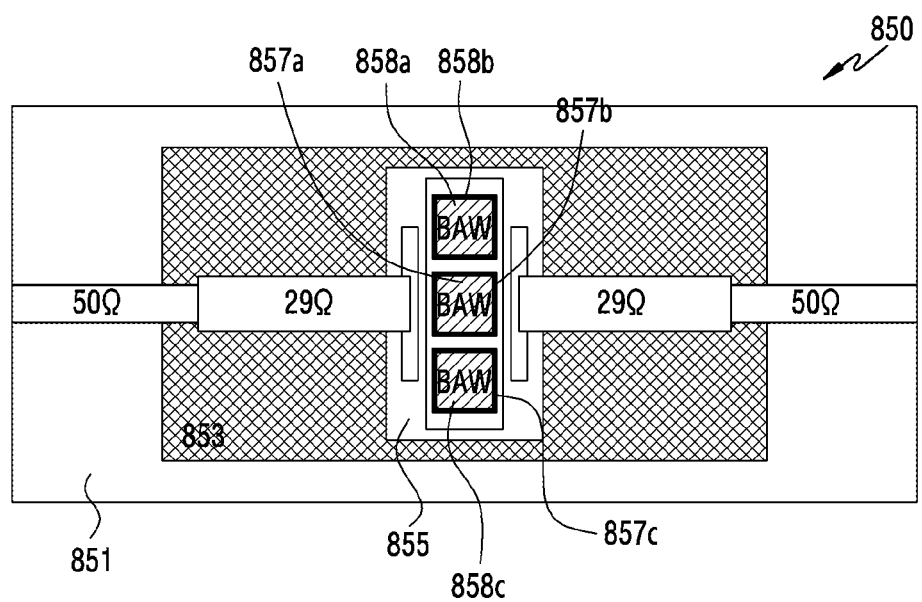
Figure 8B:
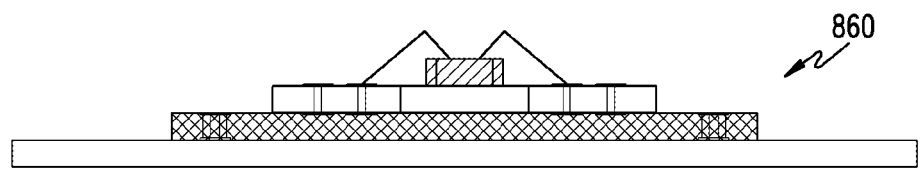
Figure 8C:
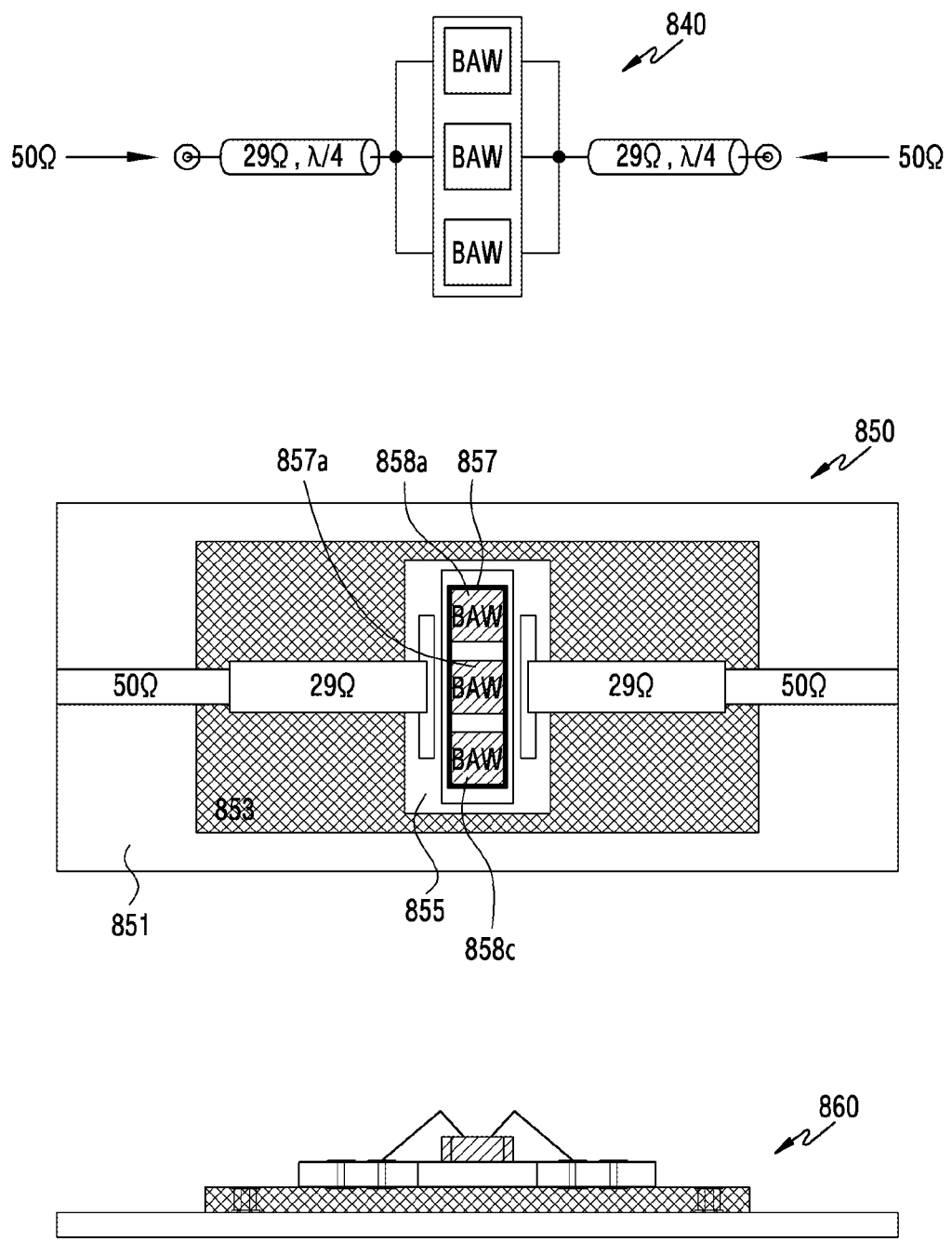

FIG. 8A and FIG. 8C illustrate examples of a package including a combine filter and an impedance matching circuit according to example embodiments. Hereinafter, although a structure in which a filter package is disposed inside a module substrate is exemplified in FIG. 8A and FIG. 8C, the filter package may also be disposed to a board without the module substrate.

FIG. 8A illustrates a filter package module to which a single filter is disposed between an input stage and an output stage. A schematic diagram 810 shows a circuit diagram in which a transmission line and the single filter (e.g., a BAW filter) are coupled between the input stage and the output stage. A front view 820 illustrates a package module 823 disposed to a board 821 viewed in a downward direction of the board (i.e., from above). The board 821 may be a board (i.e., a main board, a mother board, or an RF board) to which different RF elements are coupled. In addition, according to an embodiment, an antenna (or a radiation element) may be disposed to a face different from a face to which the package module 823 is attached on the board 821. The package module 823 is coupled to the board 821 through transmission lines. The package module 823 may include the transmission lines for coupling the input stage and the output stage. The package module 823 may include a package 825. A substrate of the package 825 is disposed above a substrate of the package module 823. The package 825 may include a package substrate and a die 827 to which a BAW filter is disposed. Since only one die is disposed to the package, it is required that a filter of the die is designed to allow a high power output. A cross-sectional view 830 illustrates a structure in which the board 821, the package module 823, the package 825, and the die 827 are stacked. Although the module, the package, and the die are disposed on the board in that order in FIG. 8A, an embodiment of the disclosure is not limited thereto. According to an embodiment, the module may be omitted, and only the package and the die may be stacked on the board. In addition, according to another embodiment, the package may be omitted, and the die may be directly attached on the board right after the module.

FIG. 8B illustrates a filter package module to which a single filter is disposed between an input stage and an output stage. A schematic diagram 840 shows a circuit diagram in which a transmission line and a combine filter (e.g., 3-in-1 BAW filter) are coupled between the input stage and the output stage. A front view 850 illustrates a package module 853 disposed to a board 851 viewed in a downward direction of the board (i.e., from above). The board 851 may be a board (i.e., a main board, a mother board, or an RF board) to which different RF elements are coupled. In addition, according to an embodiment, an antenna (or a radiation element) may be disposed to a face different from a face to which the package module 853 is attached on the board 851. The package module 853 is coupled to the board 851 through transmission lines. Herein, it is assumed that each impedance of the transmission line is 50 ohms. The package module 853 may include the transmission lines for coupling the input stage and the output stage. In this case, the transmission line in the package module 853 may be designed to have an impedance value for impedance matching. According to an embodiment, based on Equation 4, the transmission line in the package module 853 is a λ/4 impedance transformer, and may have an impedance of $50/\sqrt{3} \approx 29$.

The package module 853 may include a package 855. A substrate of the package 855 is disposed above a substrate of the package module 853. The package 855 may include a package substrate and dies 857a, 857b, and 857c to which BAW filters 858a, 858b, and 858c are disposed. The package 855 may be a package of a 3-in-1 (system in package (SiP): 3 dies in 1 package) type. The BAW filter 858a is located on the die 857a. The BAW filter 858b is located on the die 857b. The BAW filter 858c is located on the die 857c. An RF signal transferred from the input stage is transferred to a filter of each die with distributed power via an impedance transformer. Due to the distributed power, each BAW filter withstands only relatively lower power than the total input power. Therefore, a small-sized and low-power filter is sufficient to transfer a signal to a corresponding RF path.

A cross-sectional view 860 shows a structure in which the board 851, the package module 853, the package 855, and the die 857 are stacked. Although the module, package, and die are disposed on the board in that order in FIG. 8B, an embodiment of the disclosure is not limited thereto. According to an embodiment, the module may be omitted, and only the package and the die may be staked on the board. The package may be mounted directly on the board in a surface mounted technology (SMT) manner. In addition, according to another embodiment, the package may be omitted, and the die may be attached directly on the board after the module.

Although a deployment structure in which one die is present in each low-power filter is illustrated in FIG. 8B, an embodiment of the disclosure is not limited thereto. Unlike in FIG. 8B, according to an embodiment, one large die for a plurality of low-power filters may be disposed on a package or a module. For example, as shown in FIG. 8C, a die 857 may be located on a package substrate, and the BAW filters 858a, 858b, and 858c may be constructed on the die 857.

Although it is illustrated in FIG. 8A to FIG. 8C that an impedance matching circuit is implemented on a package substrate or a module substrate, an embodiment of the disclosure is not limited thereto. The impedance matching circuit may be easily constructed in an antenna board or a radio unit (RU) board. In addition, although it is illustrated in FIG. 8A to FIG. 8C that filters are disposed above a die through wire bonding, this is only one example of a packaging scheme, and an embodiment of the disclosure is not limited thereto. As the package scheme, bumper and flip chip bonding scheme may be used in addition to the wire bonding.

A deployment structure of a BAW filter and a module substrate or a package substrate has been described with reference to FIG. 8A to FIG. 8C. As a frequency of an electrical signal to be applied becomes close to a specific frequency, a specific acoustic wave may be generated according to a resonance phenomenon. The BAW filter may play a medium role to pass a signal between electrodes at a specific acoustic wave. Therefore, the BAW filter may perform a function of selectively passing a signal of a specific frequency. In this case, according to an embodiment, a substrate for mounting the BAW filter (i.e., a substrate to which a die of the BAW filter is attached) may include an inductor or a capacitor, tougher with the BAW filter. The inductor or the capacitor may be disposed as a passive element for processing, such as generating, amplifying, transferring, or the like, an electrical signal of a high frequency. In this case, when impedance matching is not sufficient with the package or the module of the combine filter, the inductor or the capacitor may be additionally added together with the package (or the module) to resolve this problem. In addition, according to an embodiment, a shield may be disposed in a housing shape surrounding BAW filters to ensure an electromagnetic shielding characteristic of the BAW filters (or a die including the BAW filters) on a substrate. The shield may be physically coupled to the substrate to accommodate top and bottom electrodes and a piezoelectric layer of the BAW filter. Herein, the accommodating means protecting from physical or electric shock or reducing an external influence of an object.

Figure 9A:
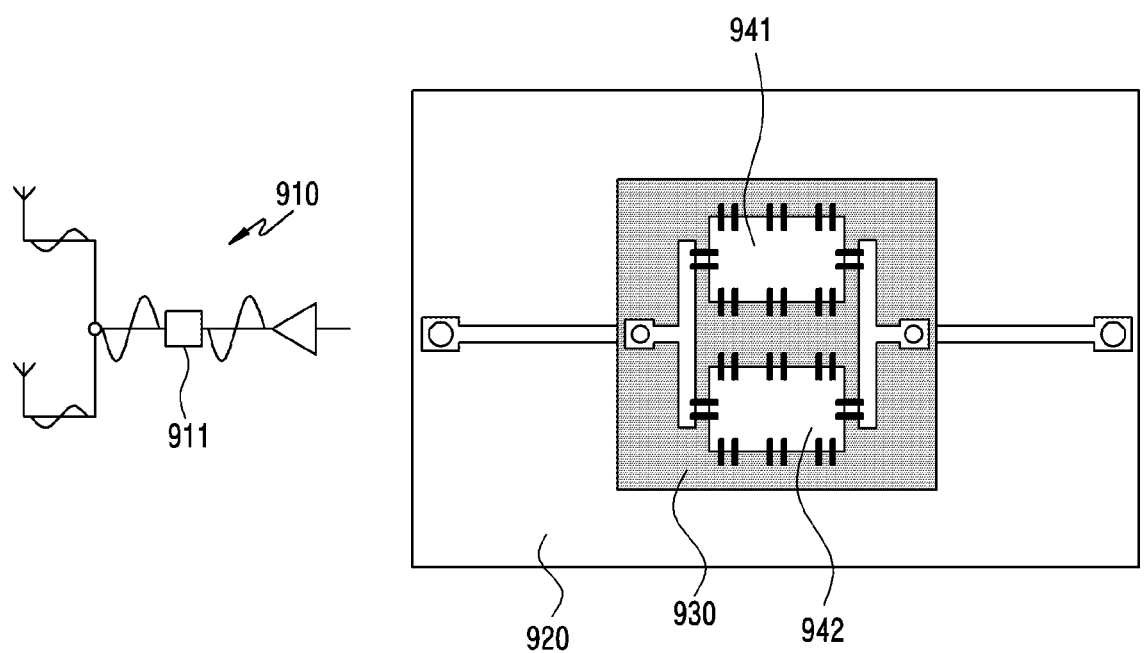
FIG. 9A and FIG. 9B illustrate an example of a combine package filter according to example embodiments.
Figure 9B:
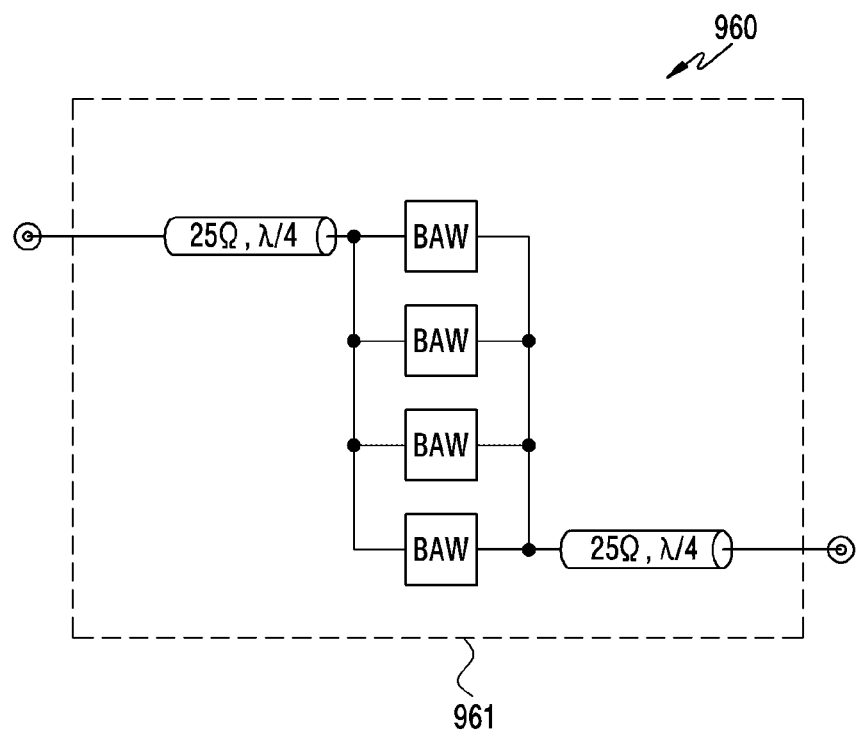
Figure 9B:
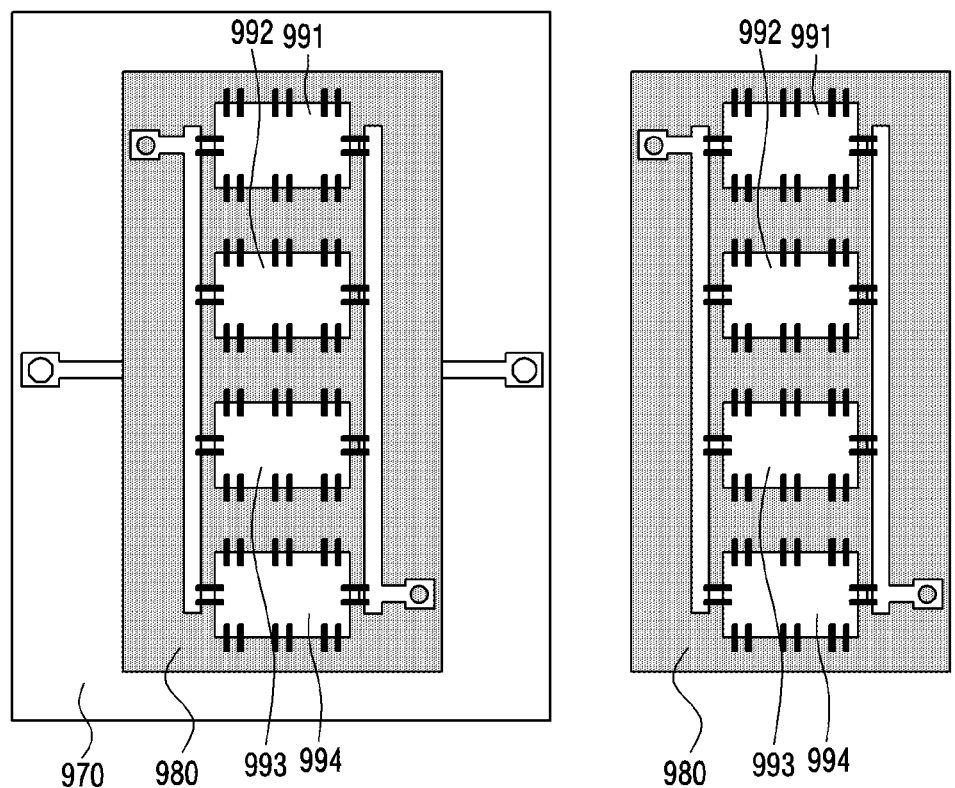

FIG. 9A and FIG. 9B illustrate an example of a combine package filter according to example embodiments. FIG. 9A illustrates a 2-in-1 filter package module. A circuit diagram 910 shows an example of a filter package module 911 and a sub-array. In this case, the filter package module 911 may include a module substrate 920. The module substrate 920 may include one or more substrates, as a PCB. The filter package module 911 may include a package substrate 930 on the module substrate 920. The package substrate 930 may include one or more substrates, as a PCB. A splitter circuit, a combiner circuit, and two dies 941 and 942 may be included in one face of the package substrate 930. Each die may include a low-power filter (e.g., a BAW filter).

FIG. 9B illustrates a 4-in-1 filter package module. A circuit diagram 960 shows an example of a combine filter 961. The combine filter 961 may include a plurality of low-power filter and λ/4 impedance transformers disposed at both ends of the plurality of low-power filters. According to an embodiment, the combine filter 961 may be constructed as a module. The combine filter 961 may include a module substrate 970, transmission lines of an impedance transformer constructed on the module substrate 970, and a filter package. Herein, the filter package may include four dies 991, 992, 993, and 994 for a plurality of low-power filters, e.g., four BAW filters, a splitter, and a combiner on a package substrate 980a. Meanwhile, according to another embodiment, the combine filter 961 may be constructed as one package without a module substrate. The package may include not only the four dies 991, 992, 993, and 994, the splitter, and the combiner but also the aforementioned impedance transformer on a package substrate 980b.

In example embodiments, instead of a high-power filter such as a metal cavity filter, a filter module or a filter package for a relatively small-sized and low-power filter has been described. According to an embodiment, the low-power filter may include a ceramic filter. In addition, according to an embodiment, the low-power filter may include a SAW filter. In addition, according to an embodiment, the low-power filter may include a BAW filter. In addition to the aforementioned examples, as a low-power filter for the deployment structure of the disclosure, a filter having a maximum power output less than a specified reference value may be used. As an available filter other than the high-power filter in the disclosure, not only the SAW filter, the BAW filter, and the ceramic filter but also any type of filters using a medium inside a resonator may be used as the low-power filter of the disclosure. For example, if any medium is used inside the resonator as a filter disposed between the splitter/combiner in the module substrate or the package substrate, it may be understood as an embodiment of the disclosure.

Due to the branching depending on the splitter and the combiner, a filter having a smaller rated capacity than a metal resonator filter may be used, which may result in a significant decrease in a size and weight of a device, as an advantage of the filter having the rated capacity or less. Although a transmission line, filter module, or filter packet for one sub-array are described in FIG. 2 to FIG. 8B, an antenna device such as an MMU may include a plurality of sub-arrays. For example, in case of 32T32R (32 transmit antenna ports and 32 receive antenna ports), the number of filter modules or filter packages of FIG. 8A to FIG. 8C may be 32. In case of using a small filter such as SAW/BAW, since additional tuning is not required and it is possible to ensure return loss performance according to a filter deployment considering phase conversion of a reflected wave, there is an increase in mass productivity, which results in a significant effect of cost saving.

As such, in order to improve a data capacity of 5G communication, the number of sub-arrays (i.e., the number of RF paths) increases. For this, the smaller the size of the filter constructed for each RF path, the more the advantage in terms of cost saving. In addition thereto, due to mass production of a BAW filter, it is possible to be connected to each sub-array with a small error. The small error may lead to a minimum cumulative loss of the entire antenna array, thereby providing an advantage of performance improvement. In other words, the structure of deploying the low-power filter of the disclosure may not only replace a high-power filter of a single sub-array but also provide an additional advantage of improving total transmission performance by being disposed to each of a plurality of sub-arrays.

Example embodiments propose a method for constituting an RF path by applying a filter having a rated capacity or less instead of a high-performance filter required for a high-power communication device. Herein, the rated capacity indicates a required power capacity per unit RF path (e.g. sub-array). A combine filter structure according to example embodiments may replace one rated capacity filter with N filters having a rated capacity or less. For this, an N-way splitter circuit capable of branching a unit path is required. The filter having the rated capacity or less may be disposed to each branch. In this case, an impedance mismatch caused by a deployment of a filter and a combination of N filters may be resolved through an impedance matching circuit. According to an embodiment, an impedance transformer (e.g., a λ/4 impedance matching circuit) for a combine filter may be constructed to resolve the impedance mismatch. In addition, according to an embodiment, lumped elements for the combine filter may be constructed to resolve the impedance mismatch.

Since a small filter having a rated capacity or less is used, in addition to making the filter small in size and light in weight, it is possible to significantly reduce a weight and size of a 5G communication device. A combination/distribution loss is not great and a length of transmission lines in a combine filter is short, which results in a relatively small loss.

In example embodiments, when the plurality of low-power filters replace the high-power filter, a circuit structure for signal branching such as a splitter and a combiner is required. According to an embodiment, in one filter module or one filter package, a splitter and a combiner may be present together with the plurality of low-power filters. However, according to another embodiment, it may be constructed as a plurality of separate modules. Hereinafter, an example of a filter structure in which a splitter or a combiner is constructed in the form of a module separate from a plurality of low-power filters is illustrated in FIG. 10.

Figure 10:
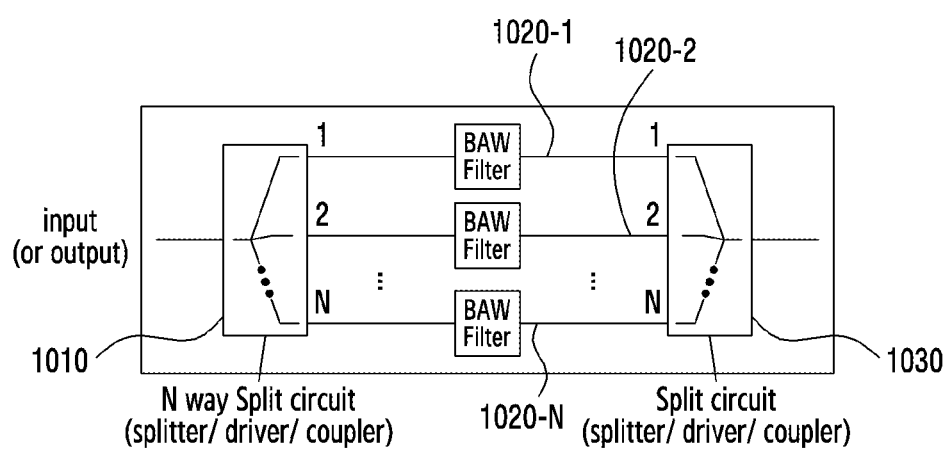
FIG. 10 illustrates an example of a splitter module and a combine filter module according to example embodiments.

FIG. 10 illustrates an example of a splitter module and a combine filter module according to example embodiments. The splitter module may be configured to combine N paths into one path or to branch one path into N paths. A total of N filters having a rated capacity or less and a splitter circuit may be constructed in units of each module. An N-way splitter module may be constructed of up to N−1 stages. Although such a modularization results in an increase in a size/loss compared to the SiP structure of FIG. 8B or FIG. 8C, when it is constructed through the modularization, there is an advantage in that a design is easier.

Referring to FIG. 10, a filter module may include a first splitter module 1010 and a second splitter module 1030. Herein, the splitter module indicates a circuit which performs a splitter function. The splitter module may be referred to as various names such as a divider/combiner/coupler or the like in addition to the splitter according to a signal flow direction. The first splitter module 1010 may distribute a signal of an input unit to each of N paths. The second splitter module 1030 may combine N signals into a single signal and transfer the single signal to an output unit. N low-power filters 1020-1, 1020-2, . . . , 1020-N may be disposed between the first splitter module 1010 and the second splitter module 1030. Each low-power filter (e.g., a BAW filter) may be configured to allow 1/N distributed power.

Figure 11:
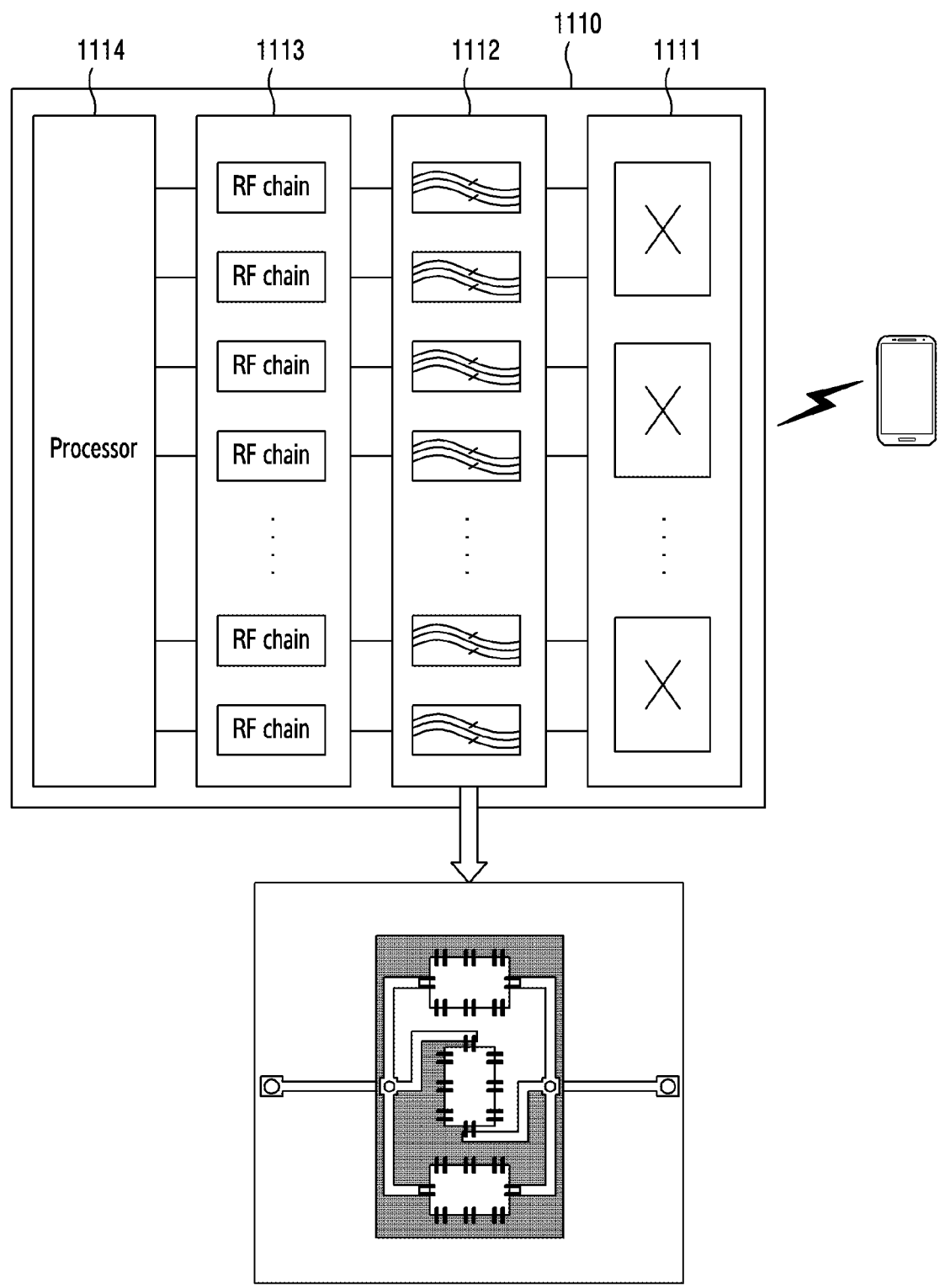
FIG. 11 illustrates a function structure of an electronic device including a combine filter according to various example embodiments.

FIG. 11 illustrates a function structure of an electronic device including a combine filter according to various example embodiments. Herein, an electronic device 1110 of FIG. 11 may include a Massive Multiple Input Multiple Output unit (massive MIMO unit, or MMU) device. The MMU device may indicate a device which transmits or receives a signal of a specific frequency band (e.g., frequency range (FR) #1: 7.125 GHz or less) to provide a service. In addition, the electronic device 1110 of FIG. 11 may include a device which uses a signal of an mmWave band. The device which uses the signal of the mmWave band may indicate a device which transmits or receives a signal of a specific frequency band (e.g., FR #2: 24.25 GHz or higher) to provide a service. However, the disclosure is not limited thereto, and the electronic device 1110 may include a device which transmits or receives an RF signal to provide a service. In addition, the electronic device 1110 of FIG. 11 may indicates an electronic device for wireless communication such as a base station or a terminal.

Referring to FIG. 11, an exemplary functional configuration of the electronic device 1110 is illustrated. The electronic device 1110 may include an antenna unit 1111, a filter unit 1112, a radio frequency (RF) processing unit 1113, and a control unit 1114.

The antenna unit 1111 may perform functions for transmitting or receiving a signal through a radio channel. In other words, the antenna unit 1111 may receive a signal transmitted from another electronic device and transmit the signal to the filter unit 1112, and may transmit (or radiate) to the outside the signal received from the filter unit 1112. The antenna unit 1111 may include at least one antenna. Herein, the antenna may be referred to as an antenna element or an antenna device. The antenna element may include a conductor formed on a substrate (e.g., a PCB) or a radiator constructed of a conductive pattern. The antenna element may radiate an up-converted signal on the radio channel or may obtain a signal radiated by another device. In some embodiments, the antenna unit 1111 may include an antenna array (e.g., a sub array) constituting an array of a plurality of antenna elements. Herein, the antenna array may indicate a linear array, a planar array, or a tridimensional array. The antenna unit 1111 may be electrically coupled to the filter unit 1112 through RF signal lines. The antenna unit 1111 may be placed or mounted on the PCB including the plurality of antenna elements. The PCB may include a plurality of RF signal lines to couple each antenna element and a filter of the filter unit 1112. The RF signal lines may be referred to as a feeding network. The antenna unit 1111 may provide a received signal to the filter unit 1112 or may radiate the signal provided from the filter unit 1112 into the air. An antenna with a structure according to an embodiment of the disclosure may be included in the antenna unit 1111.

The antenna unit 1111 according to various embodiments may be constructed by considering polarization. Herein, the polarization may indicate linear polarization or circular polarization. Therefore, the antenna unit 1111 may include at least one antenna module having a dual-polarization antenna. The dual-polarization antenna may be, for example, a cross-pol (x-pol) antenna. The dual-polarization antenna may include two antenna elements corresponding to different polarizations. For example, the dual-polarization antenna may include a first antenna element having a polarization of +45° and a second antenna element having a polarization of −45°. The polarization may be formed of other polarizations orthogonal to each other, in addition to +45° and −45°. Each antenna element may be coupled to a feeding line, and may be electrically coupled to the filter unit 1112, the RF processing unit 1113, and the control unit 1114 to be described later.

According to an embodiment, the dual-polarization antenna may be a patch antenna (or a micro-strip antenna). Since the dual-polarization antenna has a form of a path antenna, it may be easily implemented and integrated as an array antenna. Two signals having different polarizations may be input to respective antenna ports. Each antenna port corresponds to an antenna element. For high efficiency, it is required to optimize a relationship between a co-pol characteristic and a cross-pol characteristic between the two signals having the different polarizations. In the dual-polarization antenna, the co-pol characteristic indicates a characteristic for a specific polarization component and the cross-pol characteristic indicates a characteristic for a polarization component different from the specific polarization component.

The filter unit 1112 may perform filtering to transmit or receive a signal of a desired frequency. The filter unit 1112 may perform a function for selectively identifying a frequency by forming a resonance. In some embodiments, the filter unit 1112 may form the resonance through a waveguide. For example, the filter unit 1112 may form the resonance by inserting a dielectric into the waveguide or by using a cavity. In addition, in some embodiments, the filter unit 1112 may form the resonance by way of a lumped circuit. Herein, the lumped circuit may indicate a circuit including elements which form inductance or capacitance. In addition, in some embodiments, the filter unit 1112 may include an acoustic filter such as a bulk acoustic wave (BAW) filter or a Surface acoustic wave (SAW) filter. The filter unit 1112 may include at least one of a band pass filter, a low pass filter, a high pass filter, and a band reject filter. That is, the filter unit 1112 may include RF circuits for obtaining a signal of a frequency band for transmission or a frequency band for reception. The filter unit 1112 according to various embodiments may electrically couple the antenna unit 1111 and the RF processing unit 1113 to each other.

The RF processing unit 1113 may include a plurality of RF paths. The RF path may be a unit of a path through which a signal received through an antenna or a signal radiated through the antenna passes. At least one RF path may be referred to as an RF chain. The RF chain may include a plurality of RF elements. The RF elements may include an amplifier, a mixer, an oscillator, a digital-to-analog converter (DAC), an analog-to-digital converter (ADC), or the like. For example, the RF processing unit 1113 may include an up converter which up-converts a digital transmission signal of a baseband to a digital transmission signal of a specific frequency band (e.g., a band below 7.125 GHz or a band between 24.25 GHz and 100 GHz), and a digital-to-analog converter (DAC) which converts the up-converted digital transmission signal to an analog RF transmission signal. Herein, the up converter may indicate a structure including an oscillator and a mixer of the RF processor 1113. The converter and the DAC constitute a transmission path in part. The transmission path may further include a power amplifier (PA) or a coupler (or a combiner). In addition, for example, the RF processing unit 1113 may include an ADC which converts an analog RF reception signal into a digital reception signal and a down converter which converts the digital reception signal of the specific frequency band (e.g., the band below 7.125 GHz or the band between 24.25 GHz and 100 GHz) into a digital reception signal of a baseband. Herein, the down converter may indicate a structure including the oscillator and the mixer of the RF processing unit 1113. The ADC and the down converter constitute a reception path in part. The reception path may further include a low-noise amplifier (LNA) or a coupler (or a divider). RF parts of the RF processing unit may be implemented on a PCB. The RF processing unit 1113 may include at least one radio frequency integrated circuit (RFIC), and the RFIC may include an active element and a passive element. In addition, the RFIC of the RF processing unit 1113 may be coupled to the antenna unit 1111 through an RF front end (RFFE). In this case, the RFFE may include the filter unit 1112, and may indicate a structure which further includes a mixer or an amplifier (i.e., a PA). As described above, RF parts of the RF processing unit 1113, the RFIC, or the RFFE may be implemented on a PCB. The antennas and the RF parts of the RF processing unit may be implemented on the PCB, and filters may be repeatedly fastened between one PCB and another PCB to constitute a plurality of layers.

The control unit 1114 may provide overall control to the electronic device 1110. The control unit 1114 may include various modules for performing communication. The control unit 1114 may include at least one processor (e.g., a chip-type application processor (AP), communication processor (CP), or modem). The control unit 1114 may include modules for digital signal processing. For example, the control unit 1114 may include a modem. In data transmission, the control unit 1114 generates complex symbols by encoding and modulating a transmission bit-stream. In addition, for example, in data reception, the control unit 1114 restores a reception bit-stream by demodulating and decoding a baseband signal. The control unit 1114 may perform functions of a protocol stack required in a communication standard.

The antenna unit 1111, the filter unit 1112, the RF processing unit 1113, and the control unit 1114 may be electrically coupled to each other. The electrical coupling may indicates that it is directly coupled by means of a transmission line, or may mean that it is indirectly coupled by means of a coupler. In some embodiments, a length of a transmission line which couples the antenna unit 1111 and other functional components may be determined based on a frequency band of a signal transmitted for impedance matching.

Conventionally, one high-power filter has been used for one RF path which is input to a sub-array. A rated capacity of requirements has been satisfied only with one filter. However, with the instruction of beamforming for increasing a data transfer rate and controlling high frequency performance, a greater number of filters are required in an antenna device. Since the high-power filter is not suitable for mass production due to human-involved screw-based tuning, high cost for high performance, or the like, various example embodiments propose a technique for replacing the high-power filter with a low-power filter such as a BAW filter.

A combine filter according to various embodiments is a filter having a rated capacity or less, but is disposed to each of branches of a splitter and a combiner, thereby satisfying requirements for power. Since a rated capacity required in each filter is decreased through branching, small-sized low-power filters may replace a high-power filter such as a metal cavity filter. In addition, unlike the high-power filter for high performance, since it is possible to manufacture the low-power filter in a relatively small size, a size of an antenna device may also be decreased. According to an embodiment, the splitter, the combiner, and the low-power filters may be implemented as one package. Such a package-type filter may be mounted on a board (e.g., a main board, an antenna feeder unit (AFU) board, or a radio unit (RU) board) by directly replacing the high-power filter, or may be modularized to be mounted on the board.

Although a structure of connection among a filter, an RF circuit (e.g., a power amplifier, a splitter), and an antenna element is described for example in the disclosure, since an electronic device of the disclosure is for a communication device in which a great number of antenna elements are integrated, an electronic device to which a plurality of filters are coupled may also be understood as an embodiment of the disclosure. According to an embodiment, some filters of the electronic device may have the conventional single filter, and some other filters may have the proposed combine filter (or combine package filter).

According to example embodiments, a deployment structure in which a power amplifier, a filter, and antenna elements are included has been proposed. An electronic device including such a structure may also be understood as an embodiment of the disclosure. The electronic device may include at least one processor such as a modem. At least one processor may include an up converter which up-converts a digital transmission signal to a signal of a transmission frequency, and a DAC which converts the up-converted digital transmission signal to an analog RF transmission signal. In addition, the at least one processor may include an ADC which convert an analog RF reception signal to a digital reception signal, and a down converter which converts the digital reception signal to a digital reception signal of a base band. On a path on which a signal is received, a low-noise amplifier (LNA) may be included instead of a power amplifier.

The terms 'input stage' and 'output stage' are used in the disclosure to describe a positional relationship between a splitter and a filter. This is written in terms of a transmission criterion, and the terms of the input stage or output stage are used only to explain a deployment structure illustrated in the figure, and are not understood as limiting an embodiment of the disclosure. An embodiment may be applicable not only to a transmission operation but also to an array antenna for a receiving end. In a receiving RF path, a filter structure in which low-power filters (e.g., BAW filters) proposed in the disclosure or a filter package or a combine filter module may also be understood as an embodiment of the disclosure.

The combine filter structure proposed instead of the high-power filter may include N microfilters. Each microfilter may have a relatively low power output. Herein, the high-power filter and the low-power filter are relative in concept, and various example embodiments are for providing the same performance (an insertion loss, a return loss) by replacing a high power output (W1)/small number of filters (N1) such that a relatively greater number of filters (N2>N1) are replaced with a filter having a low power output (W2<W1). As such, since the high-power filter having high performance is replaced with a smaller number of filters, a space/area required in a device may be significantly decreased.

According to various example embodiments, a small-sized electronic device may be possible with such a structure by replacing the conventional filter. Meanwhile, in addition to using only a corresponding structure in a single device, a proposed structure in which low-power microfilters are coupled in multiples (hereinafter, a multi-power control filter) together with a structure in which the conventional high-power filter and an antenna array are coupled may also be included as an embodiment of the disclosure. According to an embodiment, the conventional high-power filter may be coupled to a sub-array or an antenna element, and the multi-power control filter may be coupled, directly or indirectly, to another sub-array or another antenna element in the device.

A filter structure (N microfilters) may include N input/output ports (N is an integer greater than or equal to 2). The input/output port may indicate a signal line which provides an electrical input or electrical output of an RF signal. According to an embodiment, a filter (e.g., a multi-power control filter) based on various embodiments may be coupled with the same-type of filters in a board (e.g., a PCB). According to an embodiment, a filter (e.g., a multi-power control filter) based on various embodiments may be coupled, directly or indirectly, with the existing-type of filter (e.g., a high-power filter) in a board (e.g., a PCB). A filter including such a structure may be referred to as a parallel filter, a multiple-filter, a multi-stage filter, a module-based filter, an N-way microfilter, an N-die microfilter, a parallel power control filter, a multi-power control filter, a multi-stage power control filter, a module-based power control filter, an N-way power control filter, an N-die power control filter, or various names having a meaning similar thereto.

According to various example embodiments, an apparatus for radiating a signal in a wireless communication system may include: a power amplifier; an antenna; and a combine filter unit configured to transfer an output signal of the power amplifier to the antenna. The combine filter unit may include: a first impedance matching circuit; a second impedance matching circuit; and a plurality of filters coupled in parallel between the first impedance matching circuit and the second impedance matching circuit. Allowable power of each of the plurality of filters may be lower than a maximum power output of the power amplifier.

According to an embodiment, the first impedance matching circuit may be configured for an input impedance of an input stage of the combine filter unit and an impedance for the plurality of filters. The second impedance matching circuit may be configured for an input impedance of an output stage of the combine filter unit and an impedance for the plurality of filters.

According to an embodiment, at least one of the first impedance matching circuit and the second impedance matching circuit may include at least one inductor and at least one capacitor.

According to an embodiment, at least one of the first impedance matching circuit and the second impedance matching circuit may include a $\lambda/4$ impedance transformer.

According to an embodiment, the combine filter unit may include a module substrate and a filter package including the plurality of filters. The first impedance matching circuit, the second impedance matching circuit, and the filter package may be disposed above the module substrate.

According to an embodiment, the combine filter unit further may include a package substrate. The first impedance matching circuit, the second impedance matching circuit, and the filter package including the plurality of filters may be disposed on the package substrate.

According to an embodiment, the apparatus may further include a printed circuit board (PCB). The power amplifier may be disposed to a first face of the PCB. The combine filter unit may be disposed to the first face of the PCB.

According to an embodiment, a plurality of antenna elements of the antenna may be disposed to a second face of the PCB, opposite to the first face of the PCB.

According to an embodiment, the combine filter unit may include a plurality of dies for the plurality of filters. Each of the plurality of dies may be disposed between the first impedance matching circuit and the second impedance matching circuit.

According to an embodiment, the apparatus may further include a single die for the plurality of filters. The single die may be disposed between the first impedance matching circuit and the second impedance matching circuit.

According to an embodiment, the plurality of filters may include a plurality of bulk acoustic wave (BAW) filters.

According to an embodiment, the allowable power of one of the plurality of filters may be less than a value obtained by dividing the maximum power output of the power amplifier by the number of the plurality of filters.

According to various example embodiments, a massive multiple input multiple output (MIMO) unit (MMU) device may include: at least one processor; a plurality of power amplifiers; an antenna array including a plurality of sub-arrays; and a plurality of combine filter units. The plurality of combine filter units may be coupled, directly or indirectly, to a corresponding power amplifier among the plurality of power amplifiers and a corresponding sub-array among the plurality of sub-arrays. A single combine filter unit among the plurality of combine filter units may include: a first impedance matching circuit; a second impedance matching circuit; and a plurality of filters coupled in parallel between the first impedance matching circuit and the second impedance matching circuit. Allowable power of each of the plurality of filters may be lower than a maximum and/or predetermined power output of the power amplifier.

According to an embodiment, the single combine filter unit may include a module substrate and a filter package including the plurality of filters. The first impedance matching circuit, the second impedance matching circuit, and the filter package may be disposed above the module substrate.

According to an embodiment, the single combine filter unit may further include a package substrate. The first impedance matching circuit, the second impedance matching circuit, and the filter package including the plurality of filters may be disposed on the package substrate.

According to an embodiment, the apparatus may further include a PCB. The plurality of power amplifiers and the plurality of combine filters may be disposed to a first face of the PCB.

According to an embodiment, the antenna array may be disposed to a second face of the PCB, opposite to the first face of the PCB.

According to an embodiment, the single combine filter unit may include a plurality of dies for the plurality of filters.

Each of the plurality of dies may be disposed between the first impedance matching circuit and the second impedance matching circuit.

According to an embodiment, the apparatus may further include a single die for the plurality of filters. The single die may be disposed between the first impedance matching circuit and the second impedance matching circuit.

According to an embodiment, the plurality of filters may include a plurality of BAW filters.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific example embodiments, a component included in the disclosure is expressed in a singular or plural form according to the specific embodiment proposed herein. However, the singular or plural expression is selected properly for a situation proposed for the convenience of explanation, and thus the various example embodiments are not limited to a single or a plurality of components. Therefore, a component expressed in a plural form may also be expressed in a singular form, or vice versa.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An apparatus for radiating a signal in a wireless communication system, the apparatus comprising:
 a power amplifier;
 a sub array including a plurality of antenna elements; and
 a filter module configured to transfer an output signal of the power amplifier to the sub array,
 wherein the filter module comprises:
  a first impedance matching circuit connected with the power amplifier;
  a second impedance matching circuit connected with the sub array; and
  a plurality of filters connected in parallel to each of the first impedance matching circuit and the second impedance matching circuit,
 wherein each of the plurality of filters is electrically connected with the power amplifier via the first impedance matching circuit and is electrically connected with the sub array via the second impedance matching circuit,
 wherein a power capacity of each of the plurality of filters is lower than a maximum power of the output signal of the power amplifier, and
 wherein a first power capacity of a first filter among the plurality of filters is less than a value obtained by dividing the maximum power of the output signal of the power amplifier by a number of the plurality of filters.

2. The apparatus of claim 1,
 wherein the first impedance matching circuit is configured for a first impedance of a first input end of the filter module and a second impedance of a second input end of each off the plurality of filters, and
  wherein the second impedance matching circuit is configured for a third impedance of a first output end of the filter module and a fourth impedance of a second output end of each of the plurality of filters.

3. The apparatus of claim 2, wherein at least one of the first impedance matching circuit or the second impedance matching circuit comprises at least one inductor and at least one capacitor.

4. The apparatus of claim 2, wherein at least one of the first impedance matching circuit or the second impedance matching circuit comprises a $\lambda/4$ impedance transformer.

5. The apparatus of claim 1,
 wherein the filter module further comprises a module substrate and a filter package including the plurality of filters, and
 wherein the first impedance matching circuit, the second impedance matching circuit, and the filter package are disposed on the module substrate.

6. The apparatus of claim 1,
 wherein the filter module further comprises a package substrate, and
 wherein the first impedance matching circuit, the second impedance matching circuit, and a filter package including the plurality of filters are disposed on the package substrate.

7. The apparatus of claim 1, further comprising:
 a printed circuit board (PCB),
 wherein the power amplifier is disposed on a first face of the PCB, and
 wherein the filter module is disposed on the first face of the PCB.

8. The apparatus of claim 7, wherein the sub array is disposed on a second face of the PCB which is opposite to the first face of the PCB.

9. The apparatus of claim 1,
 wherein the filter module comprises a plurality of dies for the plurality of filters, and
 wherein each of the plurality of dies is disposed between the first impedance matching circuit and the second impedance matching circuit.

10. The apparatus of claim 1, further comprising:

a single die for the plurality of filters, wherein the single die is disposed between the first impedance matching circuit and the second impedance matching circuit.

11. The apparatus of claim 1, wherein the plurality of filters comprise a plurality of bulk acoustic wave (BAW) filters.

12. A massive multiple input multiple output (MIMO) unit (MMU) device comprising:

at least one processor;

a plurality of power amplifiers including a first power amplifier;

a plurality of sub-arrays including a sub array including a plurality of antenna elements; and a plurality of filter modules including a filter module, wherein the filter module configured to transfer an output signal of the first power amplifier to the sub array comprises:

a first impedance matching circuit connected with the first power amplifier;

a second impedance matching circuit connected with the sub array; and a plurality of filters connected in parallel to each of the first impedance matching circuit and the second impedance matching circuit, wherein each of the plurality of filters is electrically connected with the power amplifier via the first impedance matching circuit and is electrically connected with the sub array via the second impedance matching circuit, wherein a power capacity of each of the plurality of filters is lower than a maximum power of the output signal of the first power amplifier, and wherein a first power capacity of a first filter among the plurality of filters is less than a value obtained by dividing the maximum power of the output signal of the first power amplifier by a number of the plurality of filters.

13. The MMU device of claim 12, wherein the filter module comprises a module substrate and a filter package including the plurality of filters, and wherein the first impedance matching circuit, the second impedance matching circuit, and the filter package are disposed on the module substrate.

14. The MMU device of claim 12, wherein the filter module further comprises a package substrate, and wherein the first impedance matching circuit, the second impedance matching circuit, and a filter package including the plurality of filters are disposed on the package substrate.

15. The MMU device of claim 12, further comprising:

a printed circuit board (PCB), wherein the plurality of power amplifiers and the plurality of filter modules are disposed on a first face of the PCB.

16. The MMU device of claim 15, wherein the sub array is disposed on a second face of the PCB, which is opposite to the first face of the PCB.

17. The MMU device of claim 12, wherein the filter module comprises a plurality of dies for the plurality of filters, and wherein each of the plurality of dies is disposed between the first impedance matching circuit and the second impedance matching circuit.

18. The MMU device of claim 12, further comprising:

a single die for the plurality of filters, wherein the single die is disposed between the first impedance matching circuit and the second impedance matching circuit.

19. The MMU device of claim 12, wherein the plurality of filters comprise a plurality of bulk acoustic wave (BAW) filters.

* * * * *